United States Patent
Onishi

(10) Patent No.: US 6,542,011 B2
(45) Date of Patent: Apr. 1, 2003

(54) DRIVER CIRCUIT, RECEIVER CIRCUIT, AND SEMICONDUCTOR INTEGRATED CIRCUIT DEVICE

(75) Inventor: Shoji Onishi, Gamoh-gun (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/681,502

(22) Filed: Apr. 18, 2001

(65) Prior Publication Data

US 2001/0054917 A1 Dec. 27, 2001

(30) Foreign Application Priority Data

May 23, 2000 (JP) ........................................ 2000-151499

(51) Int. Cl.[7] ................................................. H03K 3/00
(52) U.S. Cl. ...................................... 327/108; 327/206
(58) Field of Search ................. 327/108–112, 434–437, 327/205, 206

(56) References Cited

U.S. PATENT DOCUMENTS

| | | | | |
|---|---|---|---|---|
| 5,495,184 A | * | 2/1996 | Des Rosiers et al. | 327/541 |
| 5,703,508 A | * | 12/1997 | Foss | 327/111 |
| 5,949,265 A | * | 9/1999 | Bracchitta et al. | 327/206 |
| 6,002,284 A | * | 12/1999 | Hill et al. | 327/202 |
| 6,157,223 A | * | 12/2000 | Blake | 327/108 |
| 6,348,827 B1 | * | 2/2002 | Fifield | 327/278 |
| 6,404,256 B2 | * | 6/2002 | Minami et al. | 327/276 |

* cited by examiner

*Primary Examiner*—Kenneth B. Wells
(74) *Attorney, Agent, or Firm*—Anthony J. Canale; Robert A. Walsh

(57) ABSTRACT

A driver circuit and receiver circuit to reduce power consumption of a digital signal transfer circuit is described. A driver circuit 20 includes a PFET 21, an NFET 23, and an NFET 22 having a low threshold voltage. An input signal DIN-bar is supplied to a gate of the PFET 21, and a reference voltage Vref is supplied to a gate of the NFET 22. A signal having a small amplitude restricted by Vref is outputted from the driver output DOUT. A receiver circuit 40 having a PFET 41 and NFETs 42 and 43 having low threshold voltages, and an inverter having a PFET 44 and a NOT gate 45. The receiver circuit 40 shifts the level of the signal with the small amplitude, drives it with the inverter and outputs a signal ROUT having a CMOS level.

4 Claims, 18 Drawing Sheets

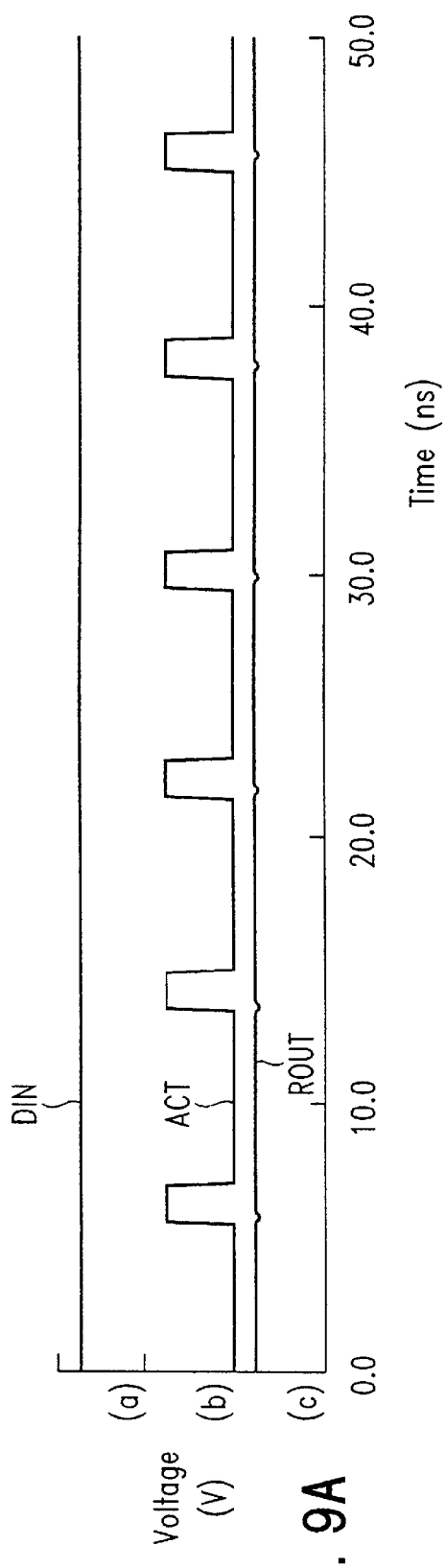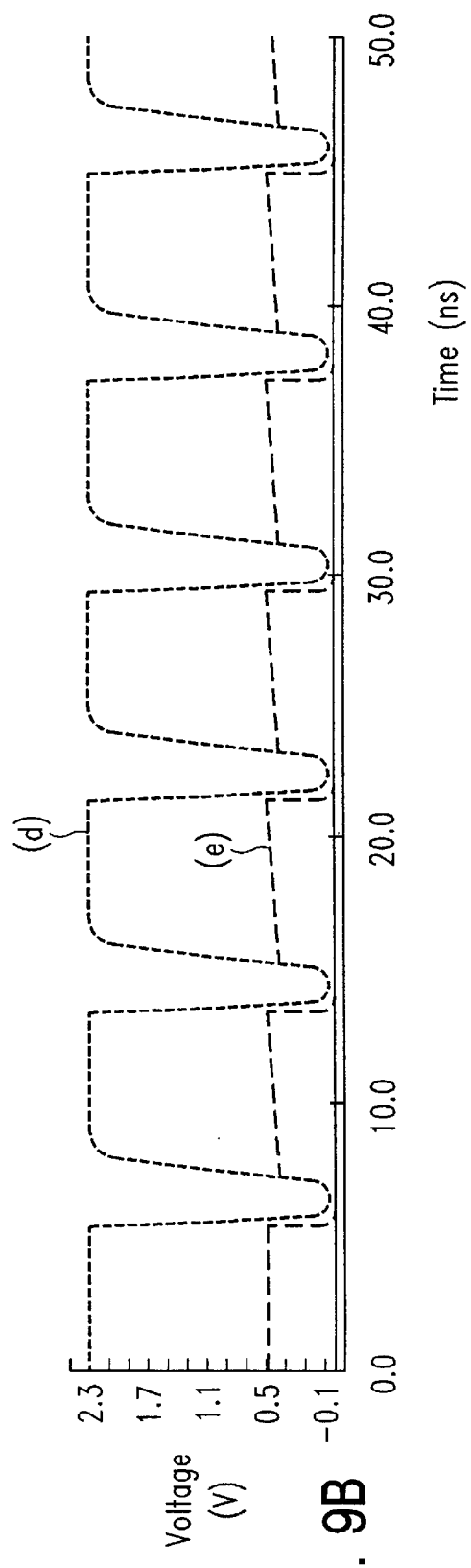
FIG. 9A
FIG. 9B

DRIVER CIRCUIT, RECEIVER CIRCUIT, AND SEMICONDUCTOR INTEGRATED CIRCUIT DEVICE

BACKGROUND OF THE INVENTION

1. Field of the Invention

The present invention relates to a driver circuit and a receiver circuit that can be applied to the transfer of digital information such as data in a semiconductor integrated circuit, and a technique for the transfer of digital signals.

2. Background

Signals handled in a semiconductor integrated circuit device are digital signals of pulse waveforms, and the transfer of signals is performed through metal wiring or the like formed in the same substrate. Since metal wiring is generally formed having a small cross-sectional area, wiring resistance is large, and coupling capacitance between wirings is large. Increase in wiring resistance and wiring capacitance increases the time constant of the pulse response, and causes pulse waveforms transferred through the wiring to become blunt. The blunt pulse may cause the clock of the signal transfer to become delayed, or the reliability of the signal transfer to decrease. Therefore, a driver circuit and a receiver circuit are used for ensuring the transfer of signals from the transmission side to the reception side. Since the signals received by the receiver circuit are of a blunt pulse form, and noise from adjacent metal wiring or the like is overlapped during the transfer of the signals, the pulse waveform is corrected by the receiver circuit. For the transfer of digital signals, the following methods are used.

FIG. 14 is a circuit diagram showing an example of conventional circuits for the transfer of digital signals. Two stages of inverters 101 and 102 configure the driver circuit 100 in the transmission side, which supplies input signals to the input terminal 103 of an inverter 101 of a first stage. The output of the second inverter 102 is from the output terminal 104 of the driver circuit, and signals that have been fully swung between the power supply voltage (e.g. 2.5 V) and the reference voltage (e.g. ground potential: 0 V) are outputted. The outputted signals are transferred through the signal line 105, and supplied to the input terminal 107 of the receiver circuit 106. The receiver circuit 106 is configured by a NOT circuit (inverter) 108 and a NAND circuit 109. The waveform of the input signal is corrected by the NOT circuit 108, and inputted to the NAND circuit 109. An action signal (ACT), i.e. a clock signal, is inputted to another input terminal of the NAND circuit 109. The output of the NAND circuit 109 is outputted from the output terminal 110 as the output of the receiver circuit 106.

FIG. 15 is a graph showing the simulated voltage waveforms at main parts of the circuit of FIG. 14. The waveform of the signal inputted to the input terminal 103 is shown by FIG. 15(a). The waveform of the signal after transferred through the signal line 105 and before inputted to the NOT circuit 108 is shown by FIG. 15(b). Bluntness is seen in this waveform. The output waveform of the NOT circuit 108 is shown by FIG. 15(c), and the blunt input waveform FIG. 15(b) has been corrected. The ACT signal is shown by FIG. 15(d), and the voltage waveform of the output terminal 110 is shown by FIG. 15(e). The ACT signal acts as the clock. The simulation conditions are: a line length of 9 mm for the signal line 105, a wiring load capacitance of 2.1 pF (of which load capacitance connected to the signal line is assumed as 500 fF), and a wiring resistance of 360 ohms.

FIG. 16 is a circuit diagram showing another example of a conventional digital signal transfer circuit. The driver circuit 120 is an n-type MISFET (n-type Metal Insulator Semiconductor Field Effect Transistor: hereafter an n-type MISFET is called NFET) 122 that discharges the electric charge pre-charged in the signal line 121, and the input signal is supplied to the input terminal 123, which is the gate of the NFET 122. The receiver circuit 124 is provided with an NFET 125, the gate of which is supplied with a reference voltage Vref, and a p-type MISFET (hereafter a p-type MISFET is called PFET) 126 for pre-charging is connected to the drain side of the NFET 125. An action signal ACT is supplied to the gate of the PFET 126, and when ACT is at Low level, the PFET 126 is turned ON, and the sense line 128 (the drain side of the NFET 125) is connected to the power supply voltage Vdd (e.g. 2.5V). At this time, the source side of the NFET 125 (signal line 121) is charged until the value becomes Vref minus the threshold voltage. The PFET 127 is an FET that has pull-up action for enhancing noise resistance when the sense line 128 is at High level while the ACT is at High level. The size of the PFET 127 is much smaller than the PFET 126.

FIG. 17 is a graph showing simulated operational waveforms of the circuit of FIG. 16. The input signal voltage at the input terminal 123 is shown by FIG. 17(a), the ACT signal is shown by FIG. 17(b), and the output signal voltage at the output terminal 130 is shown by FIG. 17(c). The line (d) shows the change in the voltage of the sense line 128, and the line (e) shows the change in the voltage of the signal line 121. Under the conditions where the ACT is at Low level, and the signal line 121 is pre-charged (t<t1 in FIG. 17), the ACT is switched to High level (t=t1) to make the receiver circuit 124 read enabled. At this time, an input signal is inputted to the input terminal 123. When a High level is inputted (FIG. 17(a)), the NFET 122 is turned ON, and the voltage of the signal line 121 is lowered (line (e) in FIG. 17). The lowered voltage is transferred to the source of the NFET 125, and when the source potential is lowered to or below the voltage determined by Vref and the threshold voltage, the NFET 125 is turned ON, and the charge of the sense line 128 is rapidly transferred to the source side. And when the sense line 128 becomes Low level, a High level is outputted from the output terminal 130 connected through the inverter 129. At this time, since the PFET 127 is always ON, an ON current flows through the PFET 127; however, since the size of the PFET 127 is small, and the ON current is extracted by the NFET 122 as long as the NFET 122 is ON, the sense line 128 is kept at Low level.

In the method as described above, the digital signal is transferred from the driver circuit to the receiver circuit through the signal line.

However, with the increase in the density and performance of semiconductor integrated circuits in recent years, the number of devices integrated in a single semiconductor substrate (chip), and the length of wiring (signal lines) formed in the chip tend to increase. In the case of a DRAM (dynamic random access memory) for example, the length of wiring such as an address signal line becomes several. millimeters to several-tens of millimeters long, whereby parasitic capacitance (floating capacitance) and wiring resistance accompanying a signal line increase. Parasitic capacitance and wiring resistance accompanying wiring cause the form of pulses that pass through the wiring to be deformed, thereby causing the delay of signal transmission. Also, the parasitic capacitance and wiring resistance increases the power consumption due to wiring.

When a conventional transmission circuit as shown in FIG. 14 is used, the output 104 of the driver circuit 100 is driven by the source voltage of 2.5 V and the reference voltage of 0 V, and the amplitude can be as large as 2.5 V. Therefore, charge-discharge current increases due to wiring capacitance in the address signal line or the like with long wiring. For example, the result of the simulation of the average current consumption waveform obtained under the above-described simulation conditions, assuming that the input signal is 125 MHz and the operating frequency of the receiver circuit 106 is 250 MHz, is about 1 mA as FIG. 18 shows. If the total of address, bank, and command lines is assumed as 20, these consume 20 mA. Current consumption must be reduced when the design to add a heat dissipation device or the like are considered, and further improvement is absolutely necessary when use in mobile applications or the like are taken into account.

Although the realization of driving as low of a voltage amplitude as possible by a differential amplifier can be considered, common lines are required as well as signal lines, resulting in the disadvantage of the bus width being doubled. The application to products that require high density, such as DRAMs, cannot tolerate the increase in the wiring area.

When a conventional transmission circuit as shown in FIG. 16 is used, since the PFET 126 for pre-charging the signal line 121 is in the receiver side, there is a problem that the size of the PFET 126 cannot be increased. In the case of a DRAM, for example, the receiver circuit of the internal address line is provided in the vicinity of the memory array. Since the vicinity of the memory array is the region where the highest density is required, an increase in the size of the PFET 126 for pre-charging cannot be allowed in the circuit design. Therefore, there is another problem that the ON current of the PFET 126 cannot be increased, and a long time is required for pre-charging. Increase in the pre-charging time inhibits the improvement of operating frequency, or lowers the margin for operating frequency.

In the case of the transmission circuit of FIG. 16, after an input signal has been sensed, the next signal cannot be read accurately unless the input 123 is once reset to a Low level and the signal line 121 is pre-charged regardless of the value of the next signal. Assuming that an input signal of a Low level is inputted after an input signal of a High level, the Low level is erroneously recognized as a High level unless the signal line 121 is pre-charged. Therefore, even if a High level is continuously inputted as in the refreshing operation of a DRAM, the pre-charging operation is performed in every cycle, and the pre-charging operation is wastefully repeated. As a result, electric power consumed by pre-charging is wasted. In this type of transmission circuit, since resetting is required every cycle, the timing control circuit for generating input signals and pre-charging pulses is also required, and electric power consumed by such a control circuit increases.

Furthermore, in the case of the transmission circuit of FIG. 16, the PFET 126 for pre-charging is in an OFF state when the circuit is in a read-enable operating condition, and the signal line 121 is in the nearly Hi-Z state (high-impedance state) at this time. That is, even if the PFET 127 is in the ON state, the PFET 127 has a small ability to supply electric current, which is not sufficient to drive the signal line 121. In such a state, the transmission circuit is easily affected by noise, for example, due to change in voltage of adjacent signal lines, and such noise may cause erroneous operations.

BRIEF SUMMARY OF THE INVENTION

SUMMARY OF THE INVENTION

A driver circuit (20, 50) of the present invention which comprises an inverter comprising a first transistor (21) of a first type and a second transistor (23) of a second type, and a third transistor (22) of a second type provided between the first transistor (21) and the second transistor (23), to which a second voltage (Vref) lower than a first voltage (Vdd) that drives the circuit is supplied at the control input terminal thereof.

According to such a driver circuit, the output voltage can be limited by the second voltage (Vref) impressed on the gate of the third transistor (22), while driving the input signal with the inverter. Since the amplitude of signal waveforms supplied to the signal line is small, the charge/discharge current consumed by the signal line can be minimized, and power consumption can be reduced.

Also, according to such a driver circuit, current for charging the signal line (30) through the first transistor (21) and the third transistor (22) can be transmitted. Therefore, when the charge transfer system is adopted, there is no need to provide an FET for pre-charging in the receiver circuit. As a result, current conventionally required for pre-charging can be eliminated. The voltage impressed in the signal line (30) can be adjusted to be lower than the first voltage (Vdd) by the second voltage (Vref) impressed on the gate of the third transistor (22). As a result, current consumption (power consumption) can also be reduced by lowering the charge-up voltage of the signal line (30).

Here, the threshold voltage of the third transistor (22) can be lower than the threshold voltage of the first or second transistor (21, 23).

Furthermore, FIG. 2 shows a fourth transistor (24) that is connected to the third transistor (22) in parallel can be provided. To the gate of the fourth transistor can be impressed a signal that is turned ON for a period shorter than the input signal or the clock period of the driver circuit when a signal to turn the first transistor (21) ON is impressed to the input (DIN) of the inverter, whereby the rising time of the output signal from the driver circuit can be shortened.

Also shown in FIG. 2 is a receiver circuit (40) of the present invention which comprises a fifth transistor (41) of a first type and a sixth transistor (42) of a second type that are complementarily composed and supplied with a first voltage (Vdd) for driving the circuit from a terminal, and with a clock signal (ACT) from the control input terminal; a seventh transistor (43) of a second type, in which a terminal thereof is connected to another terminal of the fifth and sixth transistors (41, 42), and the other terminal thereof is connected to a reference voltage (GND:ground voltage), and an input signal (RIN) of a voltage lower than the first voltage (Vdd) is supplied to the control input terminal; and an inverter (45) that inverts and outputs the output of the dynamic NAND circuit composed of the fifth, sixth, and seventh transistors (41, 42, 43).

According to such a receiver circuit, a small signal pulse can be received by a dynamic NAND circuit that functions as a level converter, and the converted level (the output of the NAND circuit) can be driven by the inverter circuit of the subsequent stage. Therefore, a signal having a small amplitude in the driving voltage level can be sensed with a high sensitivity.

Here, the threshold voltage of the seventh transistor (43) can be lower than the threshold voltage of the fifth transistor (41). By inputting a signal to this gate using the seventh transistor (43) of low threshold voltage, the receiver circuit can handle a signal of small amplitude. Also by connecting the source of the seventh transistor (43) to a reference voltage (ground voltage), the occurrence of the body effect of the seventh transistor (43) on evaluating (ACT=High) can be inhibited. If the body effect occurs, the threshold voltage of the FET is elevated, delaying the timing of turning ON. According to the present invention, however, since the body effect is limited, the delay of the timing of turning ON does not occur, and the response time of the receiver circuit (40) can be shortened.

The sixth transistor (42) can be a transistor with a low threshold voltage. Thus, the voltage when the output of the dynamic NAND is in a Low level can approach the reference voltage, and a degradation in receiver sensitivity can be prevented. That is, the receiver circuit (40) can eliminate the need for correcting the waveforms, and can shift the level of the input signal (RIN) while simultaneously receiving the input signal (RIN). Furthermore, when a plurality of signal lines (30) are present, as address lines, the skew of each address signal can be equalized by adjusting the operation of each receiver at the same time of receiving, which realizes a signal transmission circuit of low power consumption suitable for a synchronized circuit or pipe-line operation.

FIG. 8 shows another receiver circuit (60) of the present invention which comprises an eighth transistor (62) that has a terminal connected to the signal line (30), a control input terminal connected to the second voltage (Vref), and another terminal connected to the output stage, for sensing change in the voltage of the signal line (30) from the charge transfer between the terminals; and a ninth transistor (61) provided between the signal line (30) and the eighth transistor (62), for separating the signal line (30) from the eighth transistor (62) while change in the voltage of the signal line (30) is not sensed.

Such a receiver circuit (60) can make the ninth transistor (61) operate as a selector, and can separate the signal line (30) from the receiver circuit, thereby allowing the signal line (30) to be charged from the driver circuit. Therefore, an FET for pre-charging is not required in the receiver circuit (60), and the occupied device area of the receiver circuit can be reduced. The reduction of the occupied device area increases circuit design flexibility. Also, the size of the conventional pre-charging circuit can be reduced, and the load capacitance to the sense line can be decreased, thus improving the sensitivity of the receiver circuit (60).

The threshold voltage of the ninth transistor (61) can be lower than the threshold voltage of the eighth transistor (62), whereby the response to sensing can be improved. The output stage of the receiver circuit can be provided with a latch circuit, which facilitates the timing design of the subsequent stage circuit receiving the output of the receiver.

A semiconductor integrated circuit device can be configured by using the above-described driver circuit (20, 50) and receiver circuit (40, 60). When the semiconductor integrated circuit device using the receiver circuit (60) is used, there is no need for resetting the input signal (DIN) in each cycle. This eliminates the need for changing the voltage of the signal line when there is no change in the input signal as in refreshing the DRAM, and saves electric power required by conventional pre-charging operations. Also, no pulse generating circuit of input signals is required, and power consumed by the pulse generating circuit can be saved. The margin for the timing control of operation signals (ACT) and inputs (DIN) is also increased. Furthermore, since the Hi-Z period when the signal line is released from any voltage can be eliminated, resistance to noise can be improved, and stable circuit operation can be realized.

The driver circuit (20, 50), the receiver circuit (40, 60), and the signal line (30) may be formed in the same semiconductor or insulator substrate, and a plurality of signal lines (30) may be formed in parallel apart from each other. Since the semiconductor integrated circuit of the present invention has a low sensitivity to noise, it is especially effective to apply the semiconductor integrated circuit of the present invention to highly integrated semiconductor integrated circuits in which a plurality of signal lines are formed in parallel.

An aspect of the present invention is to decrease the electric power consumed by digital signal transmission circuits.

Another aspect of the present invention is to improve the operational speed of digital signal transmission circuits.

Still another aspect of the present invention is to improve the noise resistance of digital signal transmission circuits.

Yet another aspect of the present invention is to improve the performance of digital signal transmission circuits, and to improve the reliability and the performance of semiconductor integrated circuits.

BRIEF DESCRIPTION OF THE SEVERAL VIEWS OF THE DRAWINGS

BRIEF DESCRIPTION OF THE DRAWINGS

Figure 1:
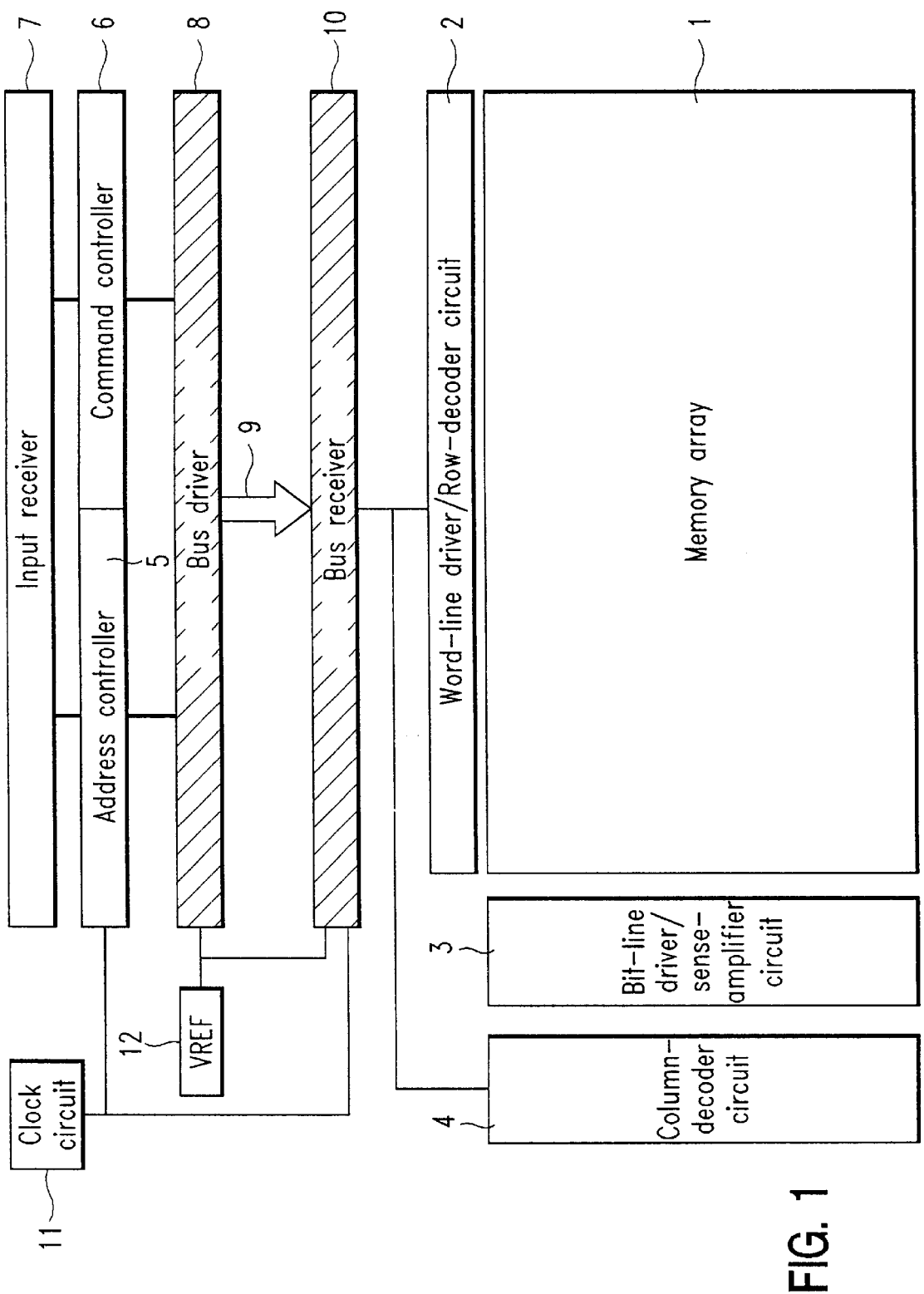

FIG. 1 is a block diagram illustrating the constitution of a DRAM according to an embodiment of the present invention.

Figure 2:
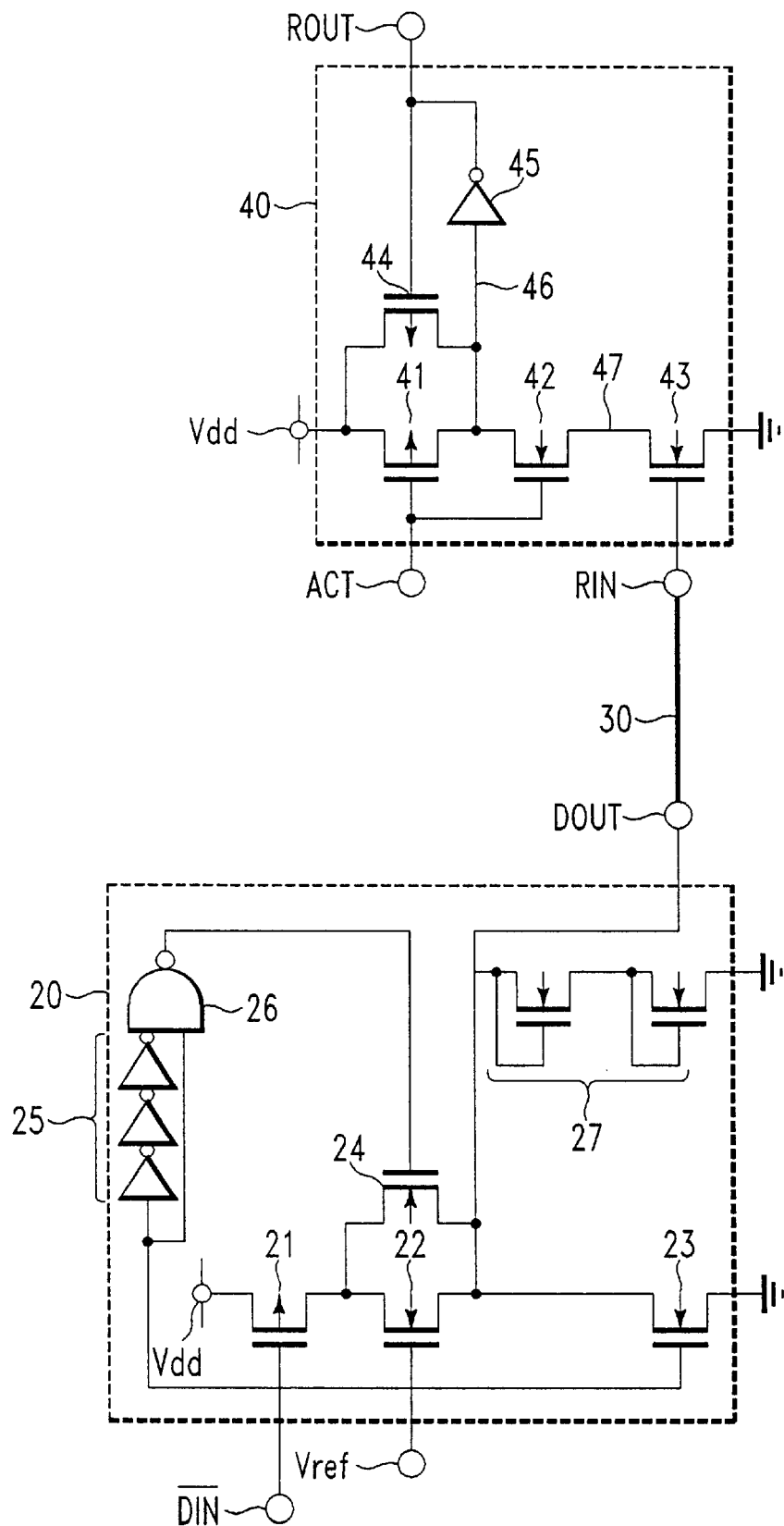

FIG. 2 is a circuit diagram showing an example of a driver circuit, a signal line, and a receiver circuit of Embodiment 1.

Figure 3A:
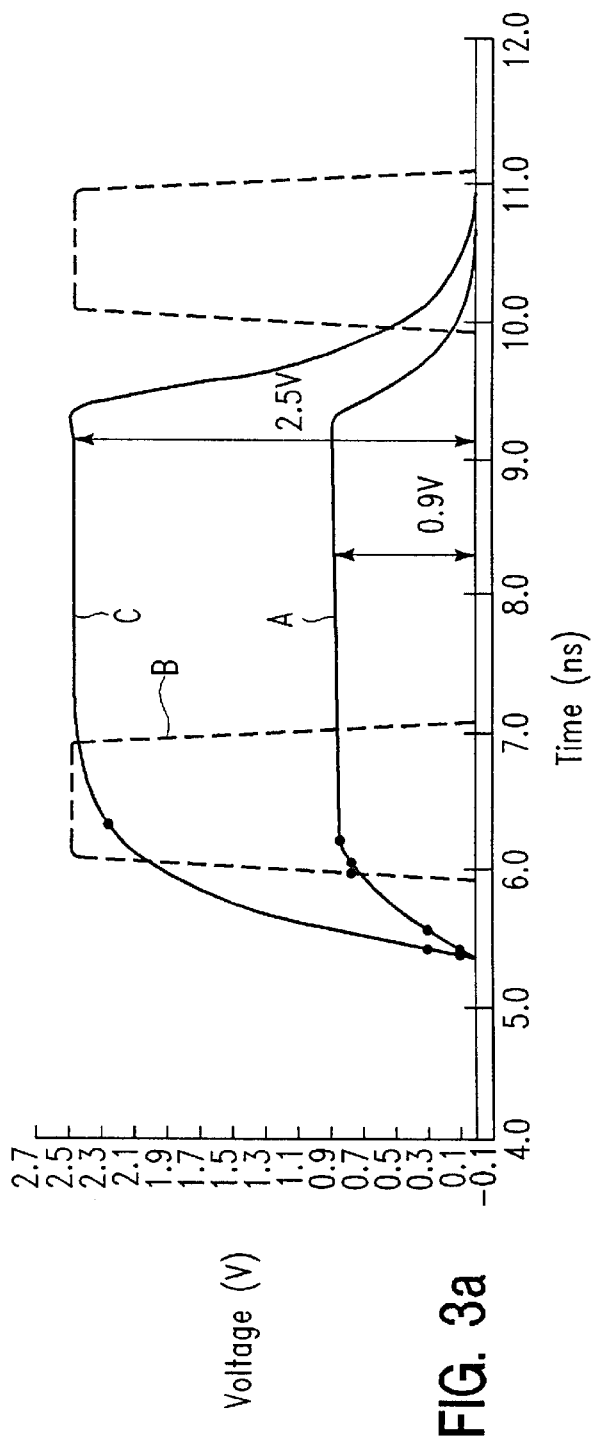
Figure 3B:
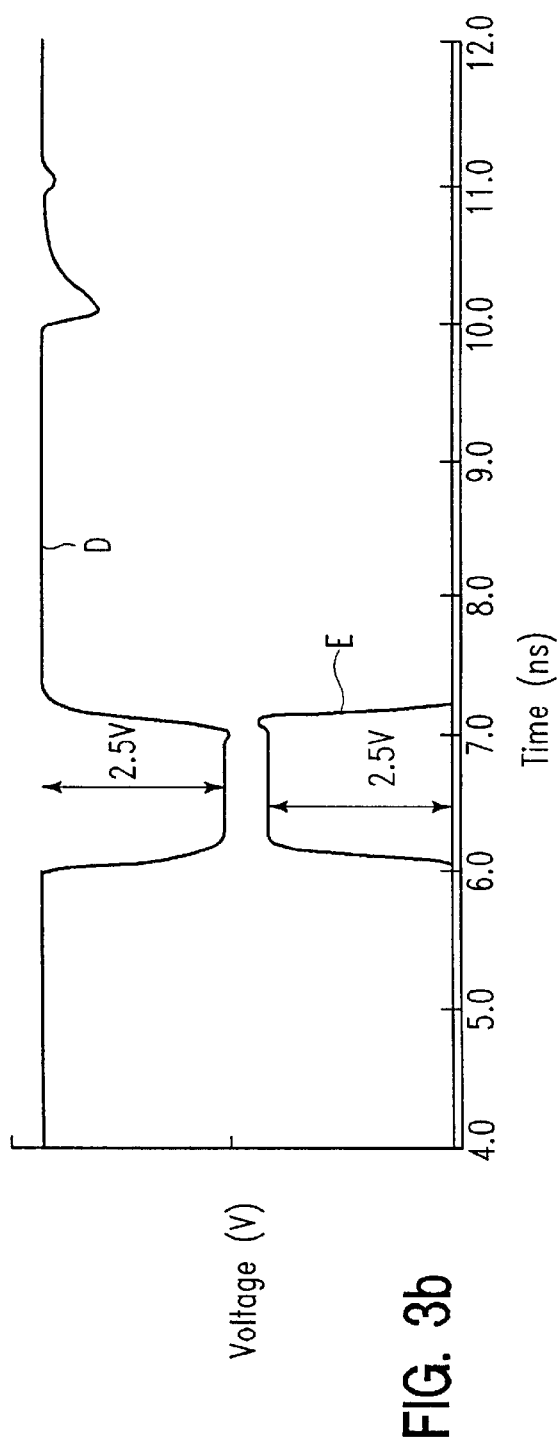

FIG. 3 is a graph showing simulated voltage waveforms from various locations on a receiver circuit.

Figure 4A:
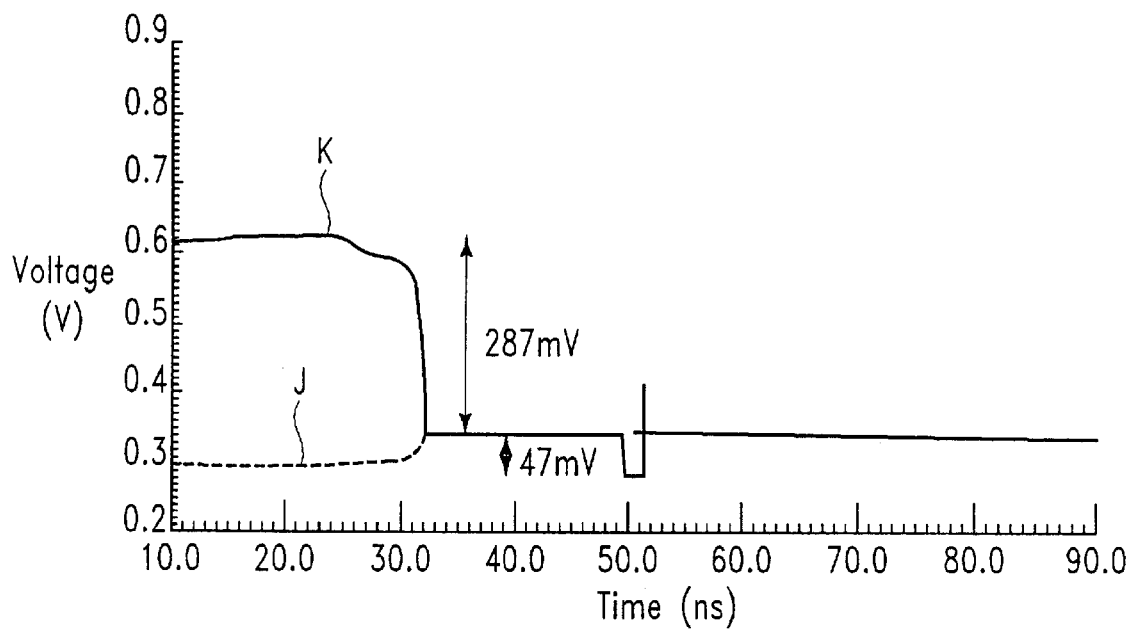
Figure 4B:
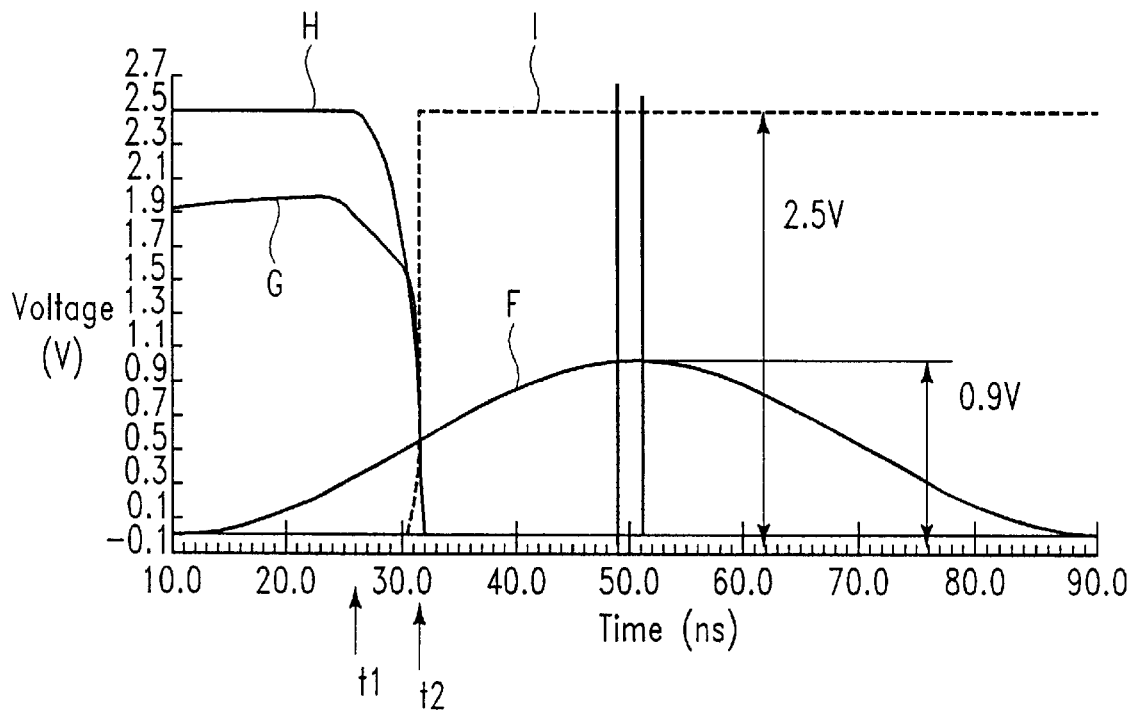

FIG. 4 is a graph showing simulated voltage waveforms from various locations of a receiver circuit when a Gaussian function-like RIN signal is inputted.

FIG. 5 is a graph showing the sensitivity of a receiver circuit according to an embodiment of the present invention as compared with the sensitivity of a conventional receiver circuit.

Figure 6:
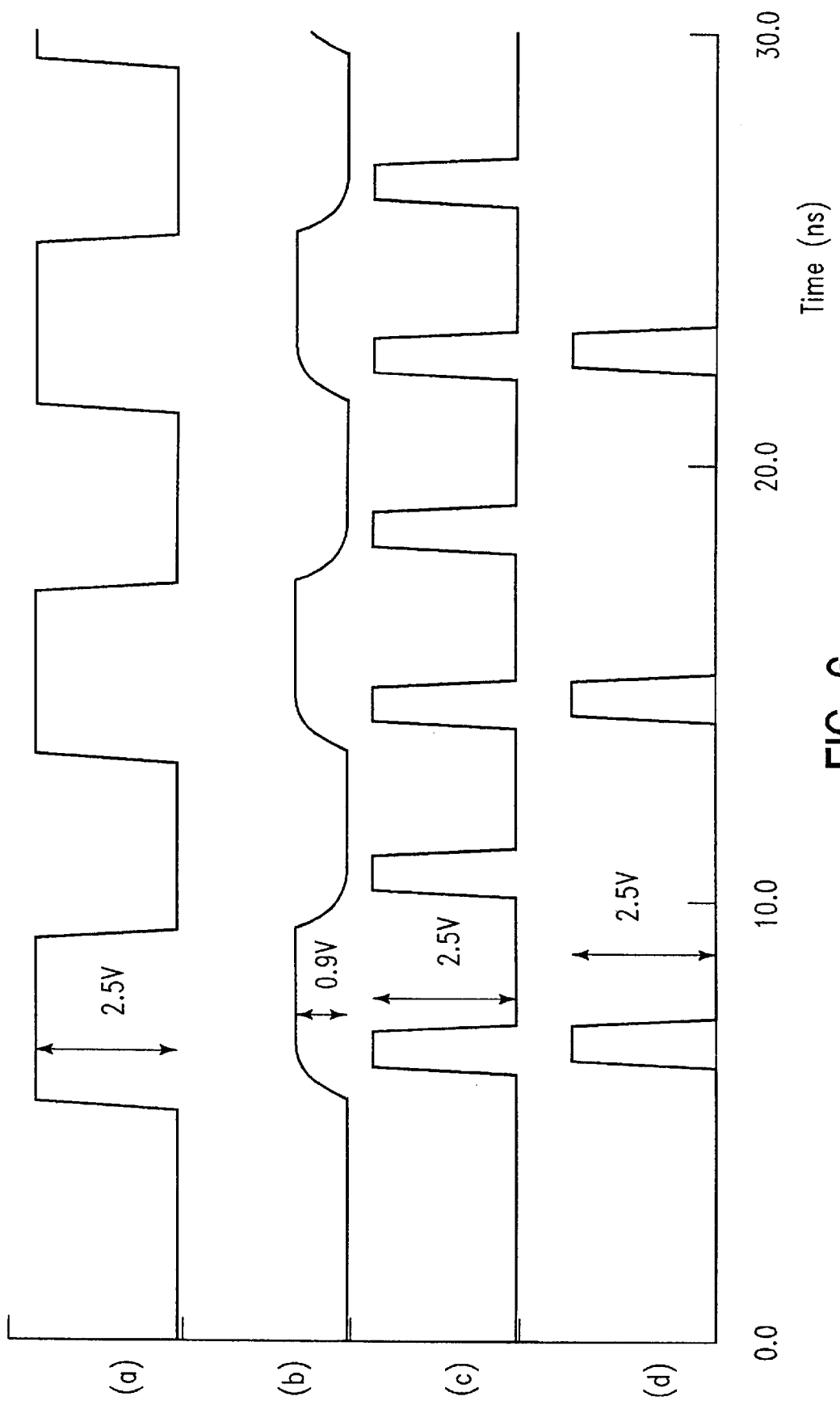

FIG. 6 is a graph showing the voltage waveform at main locations on a driver circuit and a receiver circuit.

Figure 7:
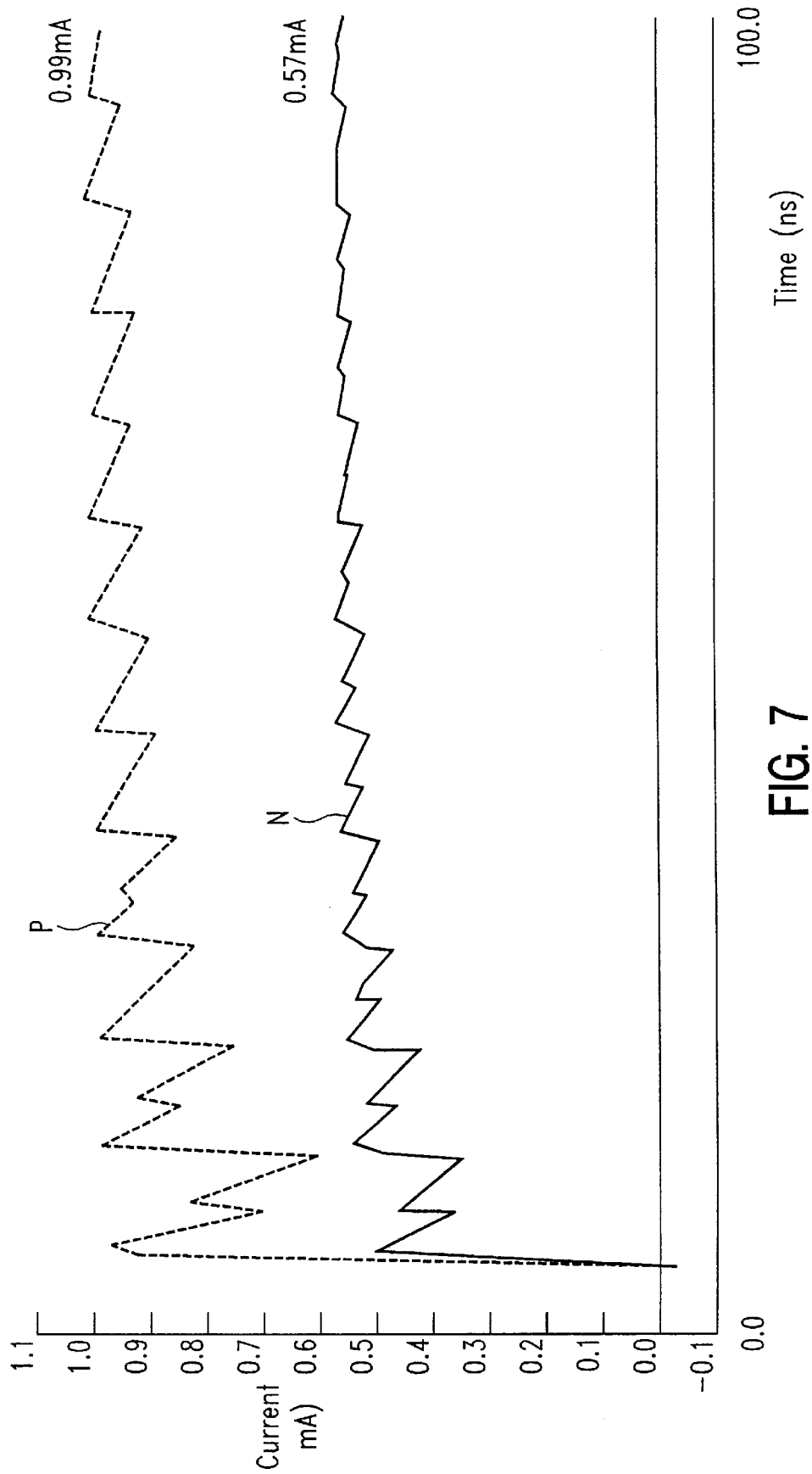

FIG. 7 is a graph showing the results of the simulation of average current consumption waveforms by the circuit of Embodiment 1 and a conventional digital transfer circuit.

Figure 8:
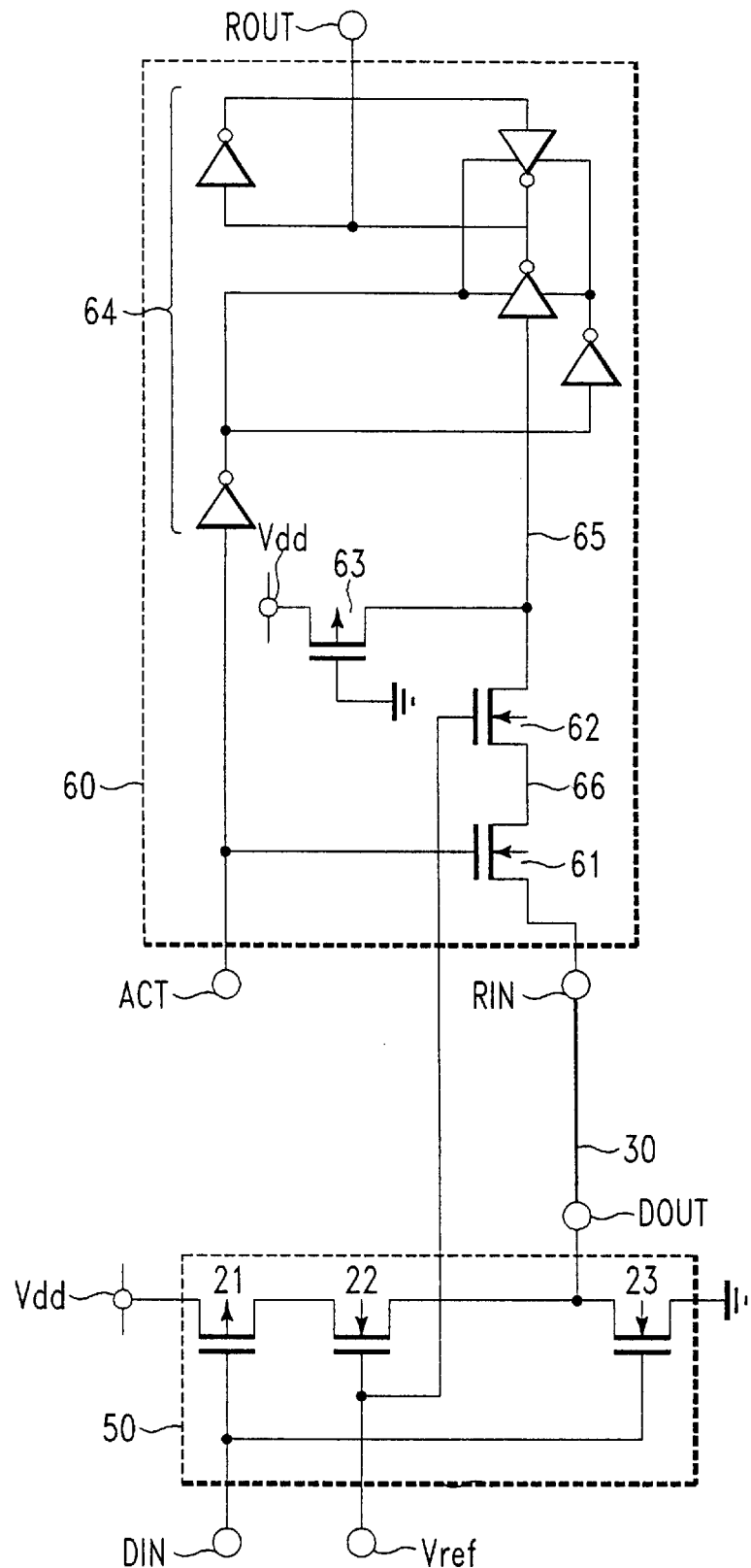

FIG. 8 is a circuit diagram showing a driver circuit, a signal line, and a receiver circuit according to another embodiment of the present invention.

FIG. 9 is a graph showing simulated operational waveforms of the circuit of FIG. 8.

Figure 10A:
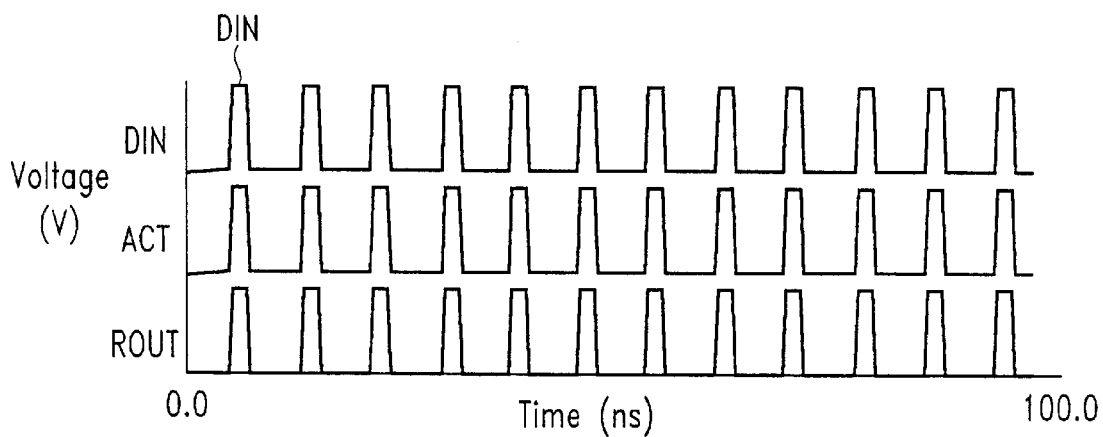
Figure 10B:
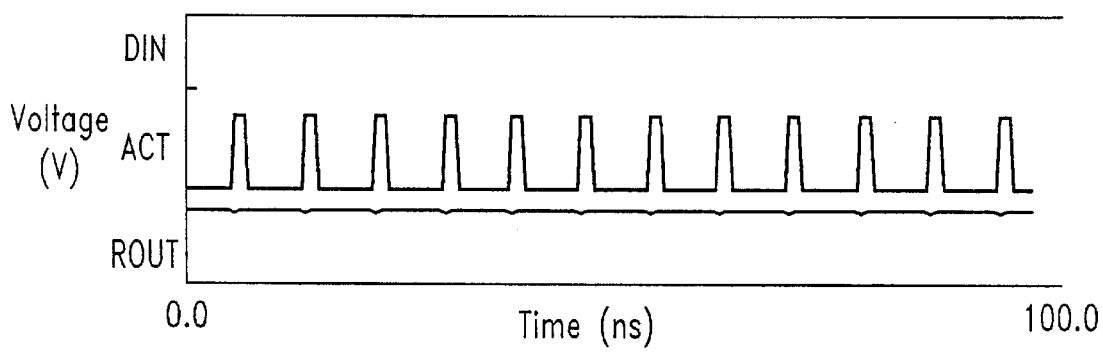

FIG. 10 is a graph illustrating the effect of a transfer circuit according to an embodiment of the present invention, and shows the case where a High level is always inputted in the input DIN.

Figure 11A:
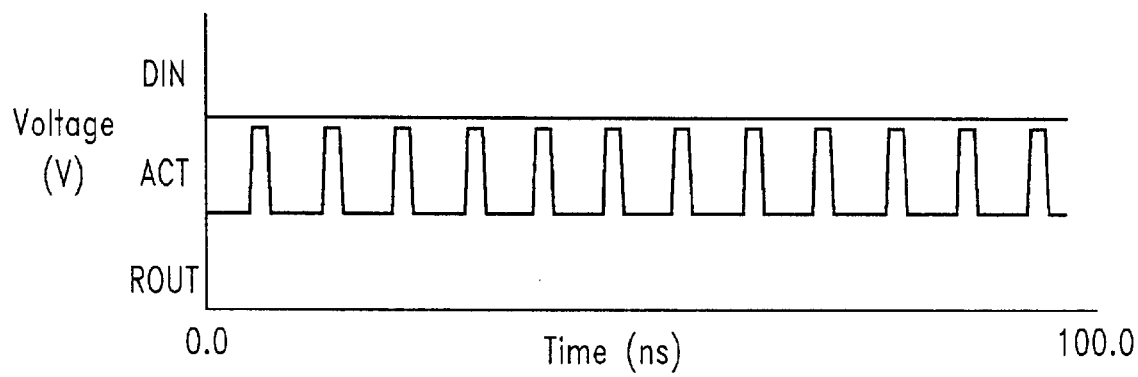
Figure 11B:
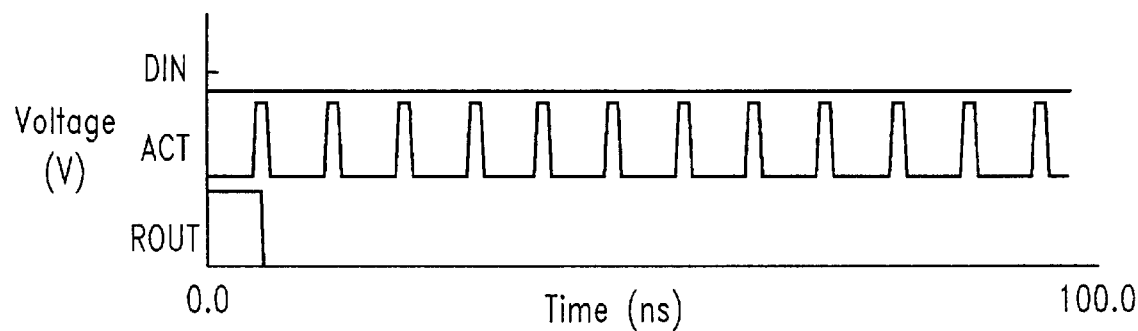

FIG. 11 is a graph illustrating the effect of a transfer circuit according to an embodiment of the present invention, and shows the case where a Low level is always inputted in the input DIN.

Figure 12A:
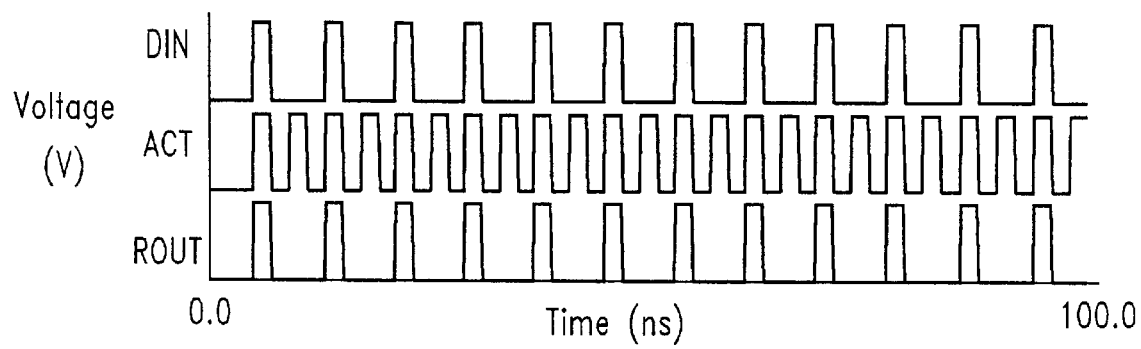
Figure 12B:
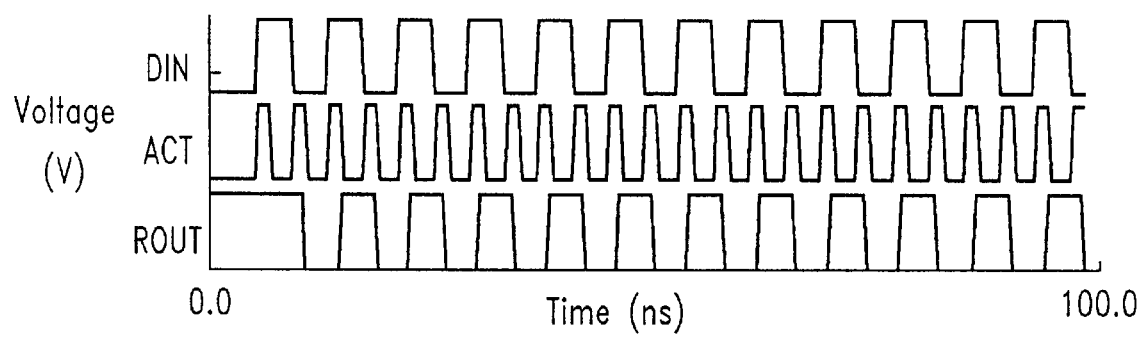

FIG. 12 is a graph illustrating the effect of a transfer circuit according to an embodiment of the present invention, and shows the case where a Low level and a High level are alternately inputted in the input DIN.

Figure 13:
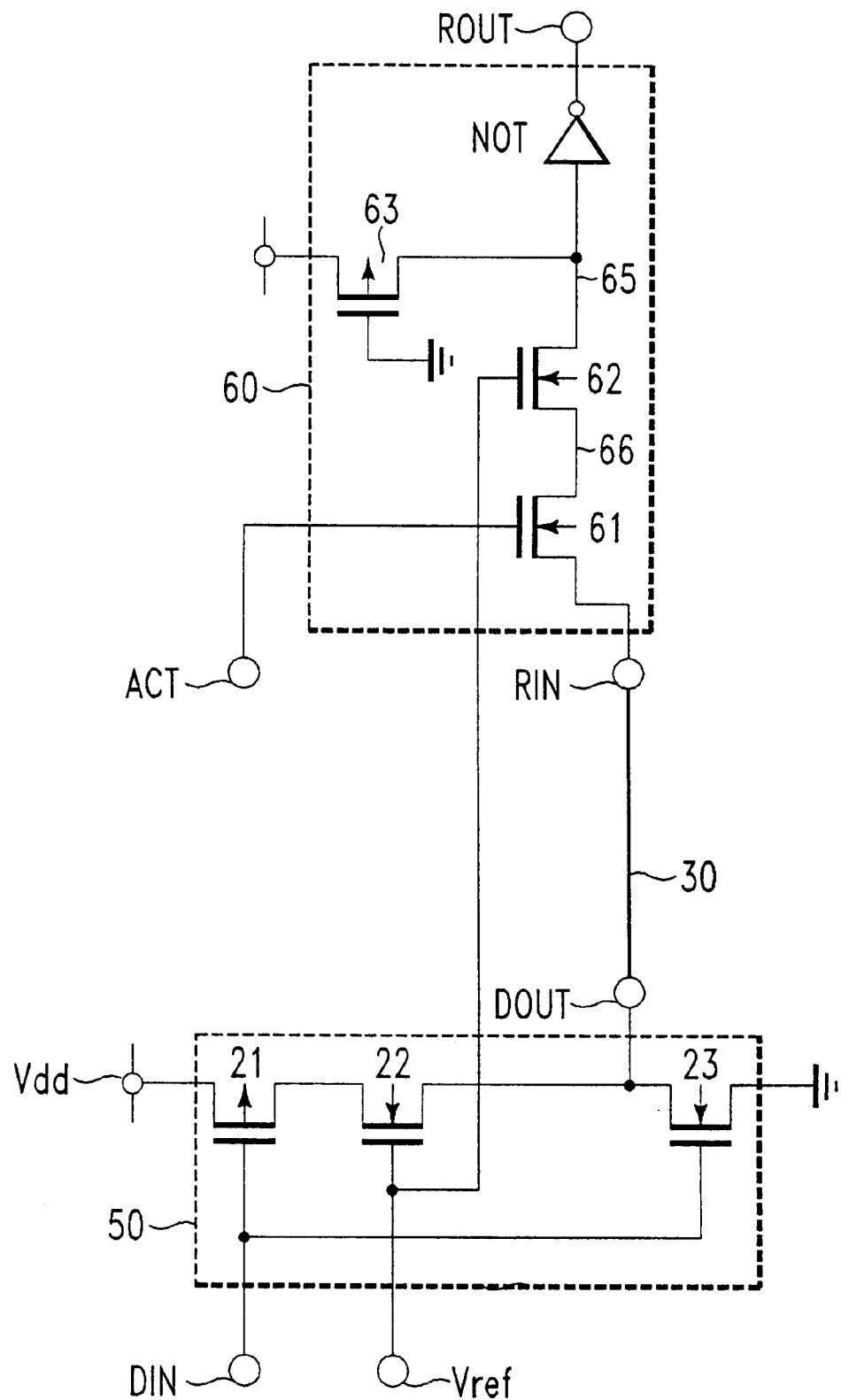

FIG. 13 is a circuit diagram illustrating another example of Embodiment 2.

Figure 14:
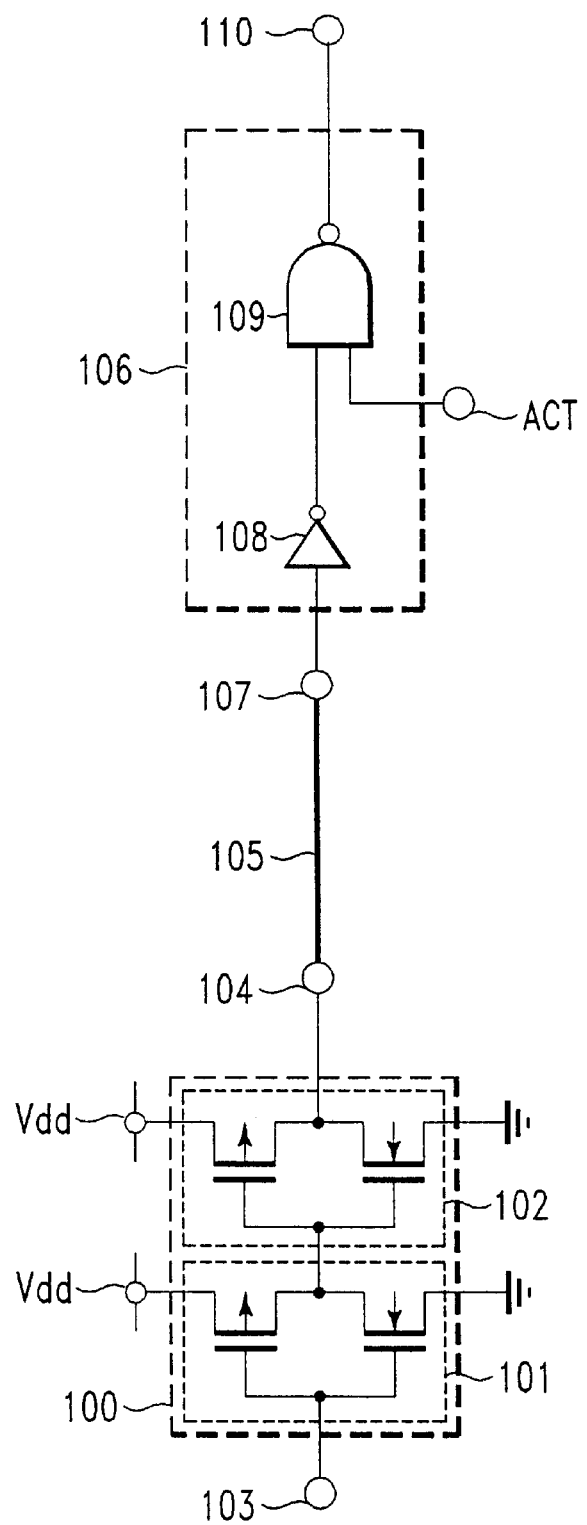

FIG. 14 is a circuit diagram showing an example of a conventional digital signal transfer circuit.

Figure 15:
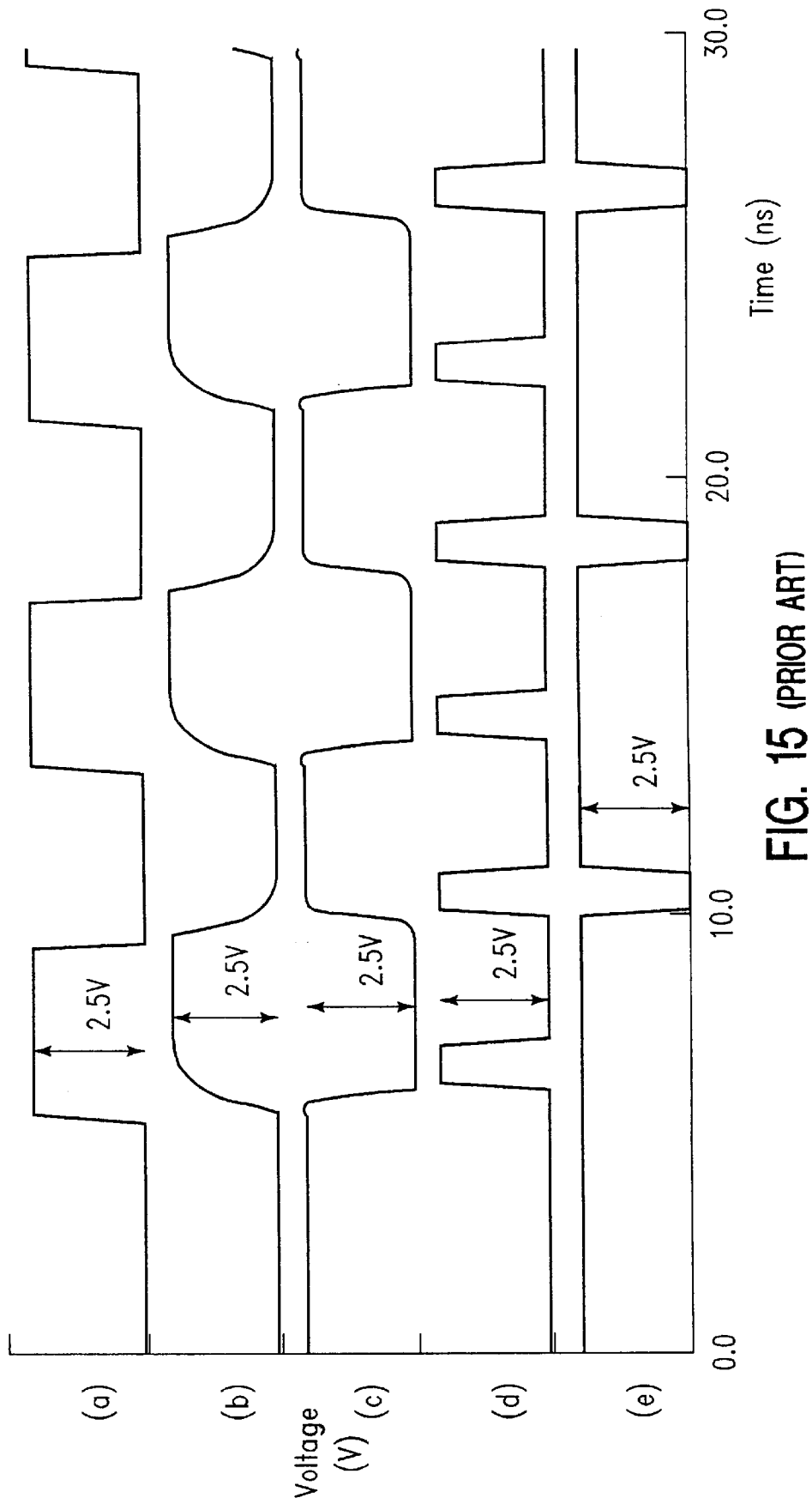

FIG. 15 is a graph showing simulated voltage waveforms at main locations on the circuit of FIG. 14.

Figure 16:
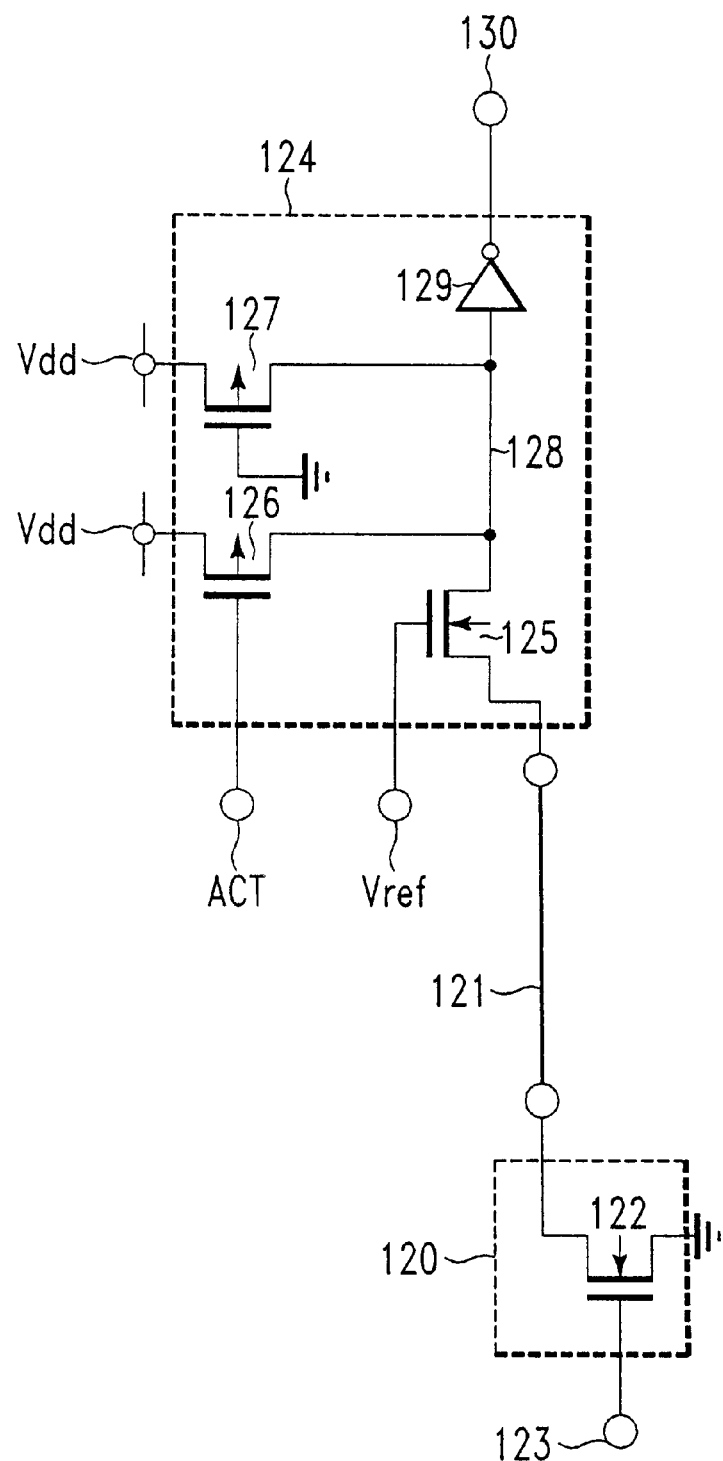

FIG. 16 is a circuit diagram showing another example of a conventional digital signal transfer circuit.

Figure 17:
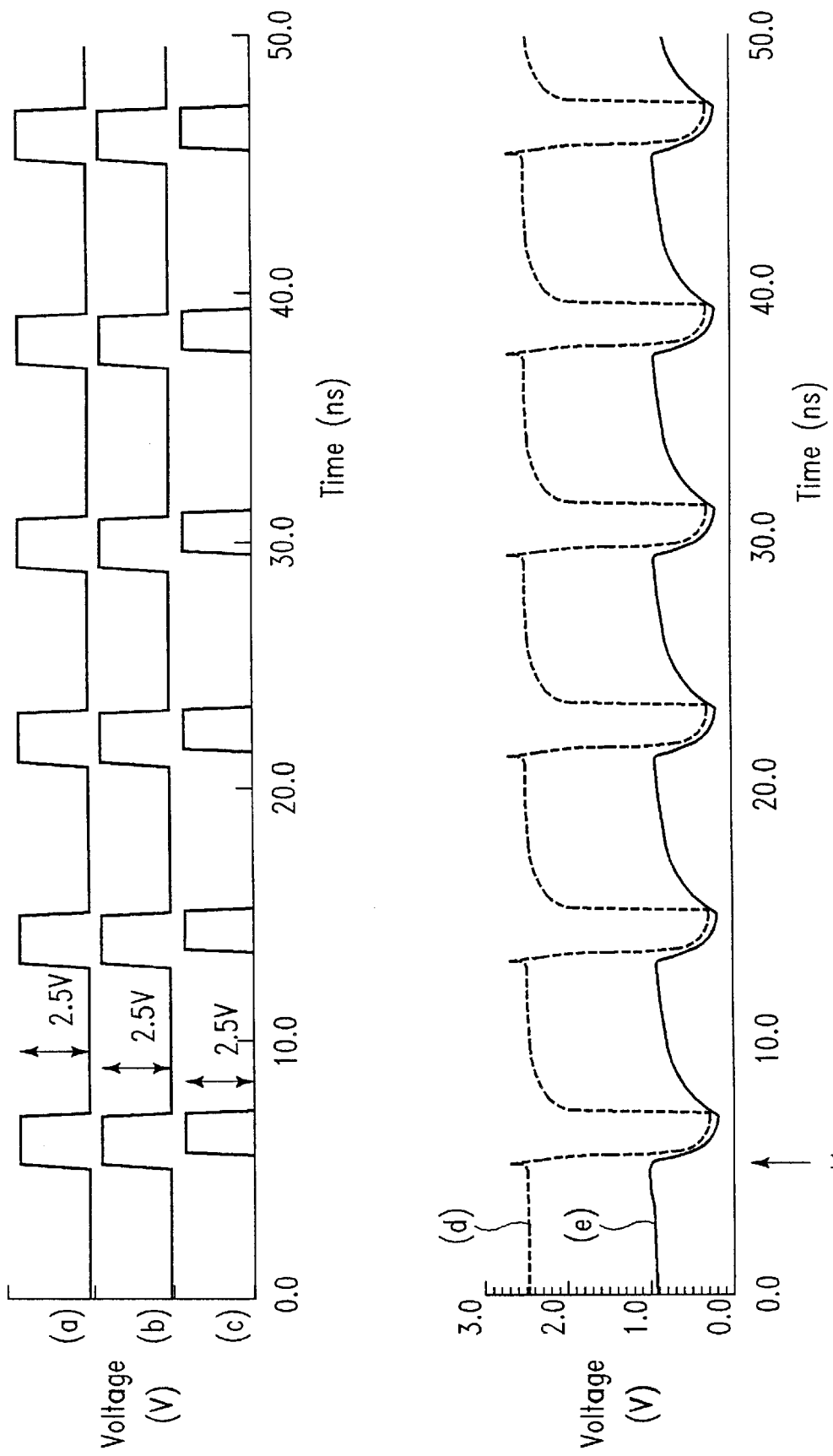

FIG. 17 is a graph showing simulated operational waveforms of the circuit of FIG. 16.

Figure 18:
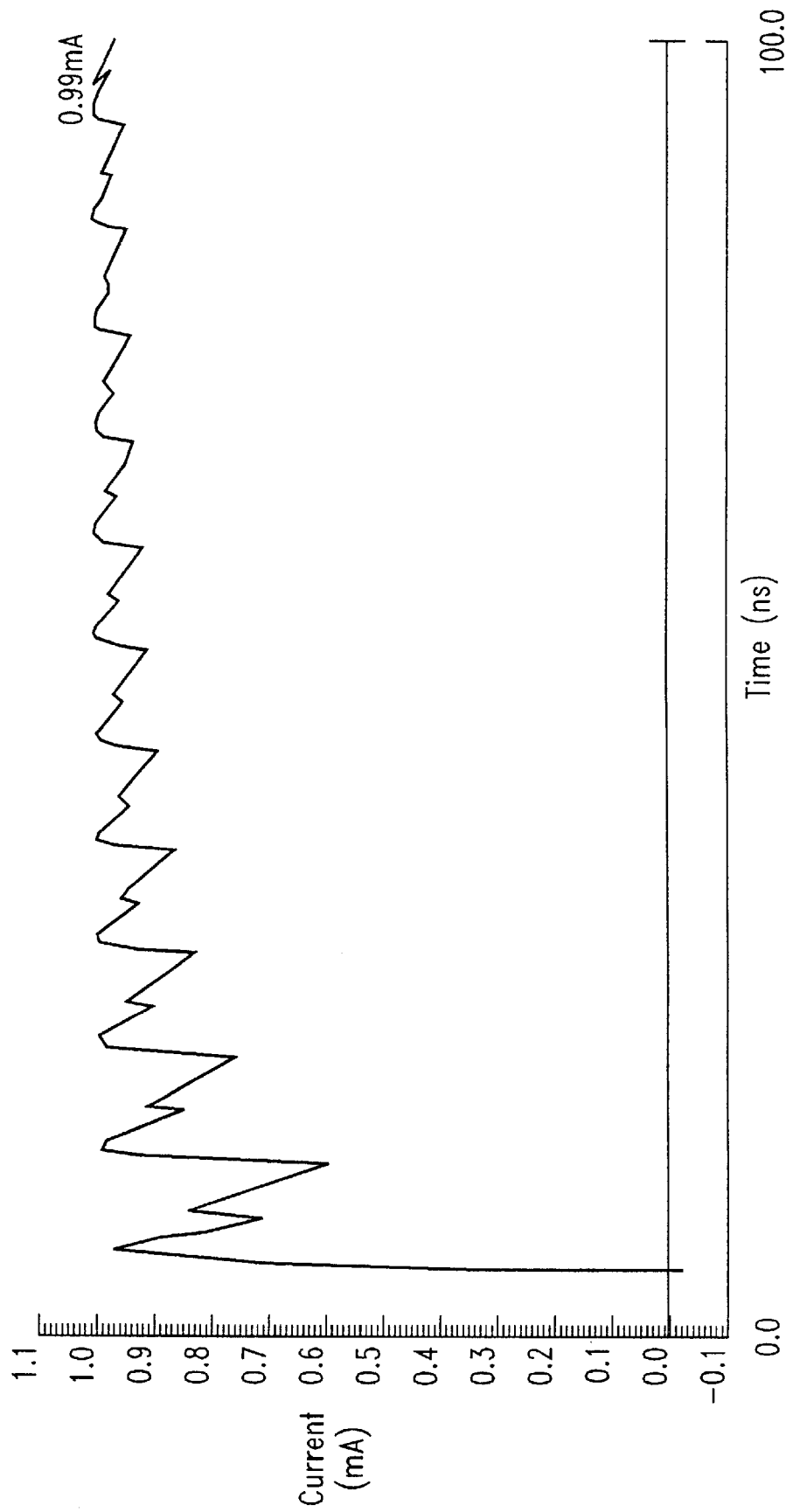

FIG. 18 is a graph showing the simulated average current consumption waveform of the circuit of FIG. 14.

DETAILED DESCRIPTION OF THE INVENTION

DESCRIPTION OF THE PREFERRED EMBODIMENTS

The embodiments of the present invention will be described in detail below with reference to the drawings. However, the present invention can be achieved in various different embodiments, and these embodiments should not be construed to limit the present invention. Throughout the description, the same numbers represent the same components.

Embodiment 1

FIG. 1 is a block diagram illustrating the constitution of a DRAM according to an embodiment of the present invention. Although a DRAM is described in this embodiment, the present invention is not limited to a DRAM, and can be applied to any semiconductor integrated circuit device that contains a driver circuit and a receiver circuit connected by a signal line.

The DRAM shown in FIG. 1 has a memory array 1 that contains a large number of memory cells (not shown) arranged in a matrix. In the area around the memory array 1 (direct peripheral circuit area), there are arranged a word-line driver/rowdecoder circuit 2, a bit-line driver/sense-amplifier circuit 3, and a column-decoder circuit 4. In the controlling area (indirect peripheral circuit area) which is apart from the memory array 1 and the circuits arranged in the vicinity thereof, an address controller 5 and a command controller 6 are arranged. Addresses and commands are inputted to the address controller 5 and the command controller 6, respectively, from external sources through an input receiver (terminal) 7.

Address data and command data from the address controller 5 and the command controller 6, respectively, are inputted to a bus driver 8, and transferred to a bus receiver 10 through a bus line 9. The bus driver 8 is placed in the indirect peripheral circuit area (controlling area). The bus receiver 10 is placed in the direct peripheral circuit area.

Address information from the bus receiver 10 is inputted to the row-decoder circuit 2 and the column-decoder circuit 4. This address information specifies a memory cell positioned at a specific address in the memory array. Control information from the bus receiver 10 controls each decoder.

Read/write data are inputted from or outputted to external sources through data lines (not shown). Alternatively, the data line may be used in common with the address line through time-sharing. In this case, data are written or read through the above-described bus line. This DRAM also comprises a clock circuit 11 and a reference voltage (Vref) generating circuit 12. The output of the clock circuit 11 is used as an ACT signal which will be described below. The function of the reference voltage (Vref) will also be described below.

FIG. 2 is a circuit diagram showing an example of the driver circuit 20, the signal line 30, and the receiver circuit 40 that constitute one channel of the bus driver 8, the bus line 9, and the bus receiver 10. The driver circuit 20 and the receiver circuit 40 are connected to each other through the signal line 30. The signal line 30 is exemplified by metal wiring formed on a semiconductor substrate.

The driver circuit 20 comprises a PFET 21, an NFET 22 having a low threshold voltage, an NFET 23, an NFET 24, plural stages of NOT gates 25, a NOR gate 26, and a clamp circuit 27. The drain of the PFET 21 is connected to the power supply voltage Vdd (e.g. 2.5 V), and the source of the PFET 21 is connected to the drain of the NFET 22. The source of the NFET 22 is connected to the drain of the NFET 23, and the source of the NFET 23 is connected to the reference voltage (e.g. ground=0 V). The input DIN-bar of the driver circuit 20 is supplied to the gates of the PFET 21 and the NFET 23. The part that connects the NFET 22 and the NFET 23 becomes the output DOUT of the driver circuit 20. That is, the driver circuit 20 has an inverter structure in which the NFET 22 of a low threshold voltage is placed in the PFET 21 side.

The operation of the driver circuit 20 is as follows: when a High level is inputted to the input DIN-bar, the PFET 21 is in the OFF state, the NFET 23 is in the ON state, and a Low-level voltage is outputted to the output DOUT. When a Low level is inputted to the input DIN-bar, on the other hand, the PFET 21 is in the ON state, and the NFET 23 is in the OFF state. At this time, the voltage of the output DOUT depends on the state of the NFET 22. As FIG. 2 shows, a reference voltage Vref is inputted to the gate of the NFET 22. When the Vref is impressed so that the voltage Vgs between the gate and the source of the NFET 22 exceeds the threshold voltage Vt, the NFET 22 is turned ON. If the voltage of the DOUT is much lower than the Vref, the NFET 22 is in the ON state, and the voltage of the DOUT is driven by the Vdd from the PFET 21 that is in the ON state and elevated. However, when the voltage of the output DOUT is elevated to Vref−Vt, the NFET 22 is turned OFF, and the voltage is no longer elevated. That is, in the circuit of such an inverter structure, the amplitude of the output DOUT can be controlled by the Vref. By setting the Vref lower than the power supply voltage Vdd, a pulse signal that is limited to a smaller amplitude than the amplitude of a conventional driver circuit can be formed, since the amplitude of a conventional driver circuit is fully swung by the voltage difference between the power supply voltage Vdd and the ground voltage. This reduces power consumption by the signal line, and reduces the power consumed by the semiconductor integrated circuit.

An NFET 24 can be connected to the NFET 22 in parallel. The output of the NOR gate 26, to which DIN-bar and the DIN-bar delayed by plural stages of NOT gates (inverter) 25 are inputted, is inputted to the gate of the NFET 24. At the output of the NOR gate 26, a High level is outputted for a short time when the fall of DIN-bar (rise of the DIN) occurs corresponding to the time delay of the plural stages of NOT gates 25, and the NFET 24 is in the ON state for a short period of time when this High level is impressed on the gate. This increases the speed of rise of the output DOUT when a High level is inputted to DIN.

Plural stages of NFETs having a low threshold voltage, of which gates and drains are short-circuited, can be connected between the output DOUT and the ground voltage. Plural stages of MISFETs can clamp DOUT so as not to output a voltage that exceeds the sum of the threshold voltages. The clamp circuit 27 can prevent an unexpectedly high voltage to be impressed to DOUT, for example, by noise accumulated in the signal line 30.

Next, a receiver circuit 40 will be described. The receiver circuit 40 comprises a PFET 41, NFETs 42 and 43 having a low threshold voltage, a PFET 44, and an inverter 45. The drain of the PFET 41 is connected to the power supply voltage Vdd, and the source of the PFET 41 is connected to the drain of the NFET 42. The source of the NFET 42 is connected to the drain of the NFET 43, and the source of the NFET 43 is connected to the reference voltage (e.g. ground voltage). The input RIN of the receiver circuit 40 is supplied to the gate of the NFET 43 having a low threshold voltage, and an operation signal ACT is supplied to the gates of the PFET 41 and the NFET 42. That is, PFETs 41 to 43 constitute a circuit of which the output is the potential of wiring 46 connected to the source of the PFET 41 and the drain of the NFET 42. In particular, in the receiver circuit 40 of this embodiment, FETs with a low threshold voltage are used for the NFETs 42 and 43 so as to have sufficient sensitivity even if a pulse signal of a small amplitude is inputted. Also, an inverter 45 whose input is the voltage of the wiring 46, is provided, and a PFET 44, to which the output of the inverter 45 is inputted to the gate of PFET 44, is placed between the wiring 46 and the power source voltage Vdd. The inverter 45 and the PFET 44 perform a latch operation when the input signal of the inverter 45 is at a High, thereby decreasing the sensitivity to noise of the output signal ROUT. This is also used for improving the ability to drive the next stage.

FIG. 3 is a graph showing simulated volte waveforms from various locations on a receiver circuit 40. The y-axis shows voltage, and the x-axis shows time. Line A is the waveform of the signal inputted to RIN, and Line B (indicated by dashed lines) are the waveforms of inputted ACT signals. For comparison, the input waveform from a conventional full-swing inverter is shown by Line C. As described above, the peak value of Line A is restricted to be lower than the peak value of Line C. The output waveform of wiring 46 when RIN and ACT are inputted at the timings shown in FIG. 3 is shown by Line D, and the signal waveform of ROUT is shown by Line E. When ACT of a High level is inputted while the input RIN (Line A) is at a High level (about 0.9 V), the output of wiring 46 changes from High to Low, and the output ROUT changes from Low to High. This process is described in further detail with reference to FIG. 4.

FIG. 4 is a graph showing simulated voltage waveforms from various locations of the receiver circuit 40 when a Gaussian function-like input signal RIN shown by Line F is inputted in the state where an ACT signal of a High level has been inputted. The y-axis shows voltage, and the x-axis shows tine. Line G shows the change in the voltage at the part where the NFET 43 is connected to the NFET 42 (wiring 47 shown in FIG. 2), and Line H shows the output voltage of wiring 46. Line I shows the change in the voltage of output ROUT. Line J shows the change in the threshold voltage Vt of the NFET 43, and Line K shows the change in the threshold voltage Vt of the NFET 42.

When RIN (Line F) increases with time as shown in FIG. 4 in the state where an ACT signal of a High level has been inputted, the gate voltage of the NFET 43 is elevated, and the NFET 43 starts to be turned ON from the time t1. Then, the voltage at the location where the NFET 43 is connected to the NFET 42 (Line G, wiring 47) begins to lower, and following this, the voltage of the wiring 46 (Line H) also begins to lower. At this time, since the voltage between the gate and the source is not high enough, the NFET 42 is not turned ON. At the time t2, the voltage of the wiring 47 reaches a Low level, and a sufficiently high voltage is impressed between the gate and the source of the NFET 42 to turn the NFET 42 ON completely. Therefore, the wiring 46 is driven by the ground voltage, and at the same time, the output of the inverter 45 (Line I) is inverted to a High level to turn the PFET 44 OFF. When the voltage of the wiring 46 is stabilized at a Low level, ROUT is also stabilized at a High level.

The change in the threshold voltage of the NFET 43 at this time is about 47 mV as Line J shows, while the change in the threshold voltage of the NFET 42 is about 287 mV as Line K shows. This means that signals can be sensed with a higher sensitivity when signals of low amplitude are inputted to the gate of the NFET 43 than the gate of the NFET 42. In general dynamic logic circuits, FETs with a low threshold value are not used. Instead, FETs with a normal threshold value are used, and the connections to the FETs that are equivalent to the NFET 43 and the NFET 42 are inverted to input ACT to the FET equivalent of the NFET 43 and to input RIN (that has an amplitude of 0–Vdd) to the part corresponding to the output of the dynamic logic circuit. Although inputting signals to the gate of an FET equivalent to the NFET 42 in a general dynamic logic circuit can be considered, the present invention provides higher sensitivity than the sensitivity of the dynamic logic circuit of such a structure.

Figure 5A:
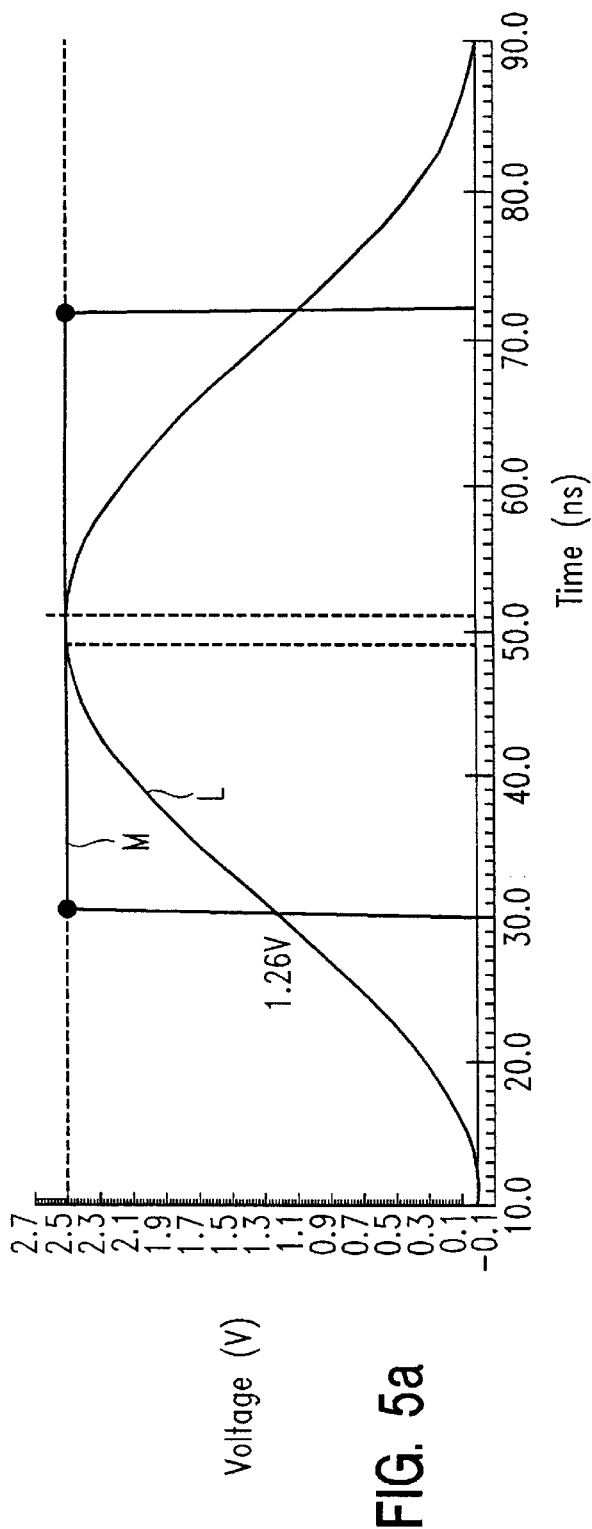
Figure 5B:
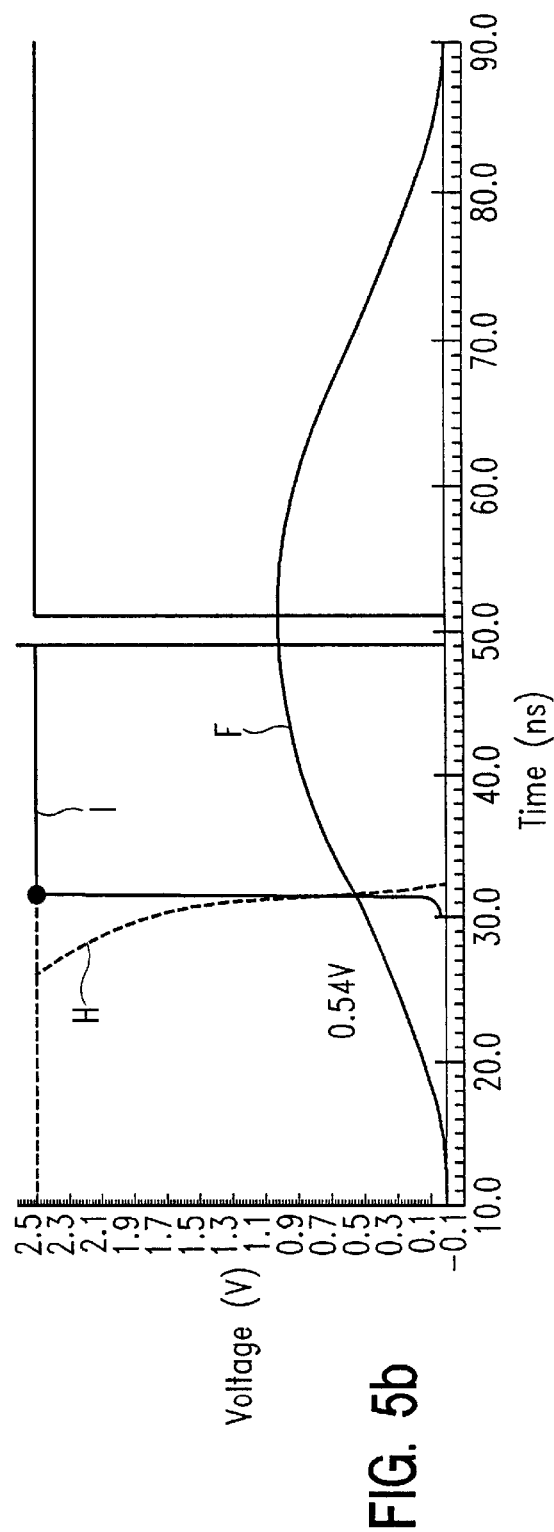

FIG. 5 is a graph showing the sensitivity of a receiver circuit according to an embodiment of the present invention compared with the sensitivity of a conventional receiver circuit shown in FIG. 14. From FIG. 5(a), which shows the output response (Line M) against the input signal (Line L) of a conventional receiver circuit, it is known that the output is changed to a High level when the input voltage becomes 1.26 V. From FIG. 5(b), which shows the response of a receiver circuit according to this embodiment, it is known that the output (Line I) is changed to a High level when the input voltage (Line F) reaches 0.54 V. Therefore, the receiver circuit according to this embodiment responds at a voltage that is about 0.7 V lower than the conventional receiver with a CMOS logic circuit.

The general operation of the above-described driver and receiver circuits will be described below referring to FIG. 6. FIG. 6 is a graph showing voltage waveforms at main locations of the above-described driver and receiver circuits. FIG. 6(a) shows the signal waveform of inverted input (DIN) supplied to the input DIN-bar of the driver circuit; FIG. 6(b) shows the signal waveform supplied to the input RN of the driver circuit; FIG. 6(c) shows the operation signal supplied to the ACT terminal of the receiver circuit; and FIG. 6(d) shows the signal waveform outputted to the output ROUT of the receiver circuit. The waveform shown in FIG. 6(b) corresponds to the output waveform of the driver circuit, and is limited to an amplitude of about 0.9 V compared to an amplitude of about 2.5V for the input signal DIN. This amplitude can be adjusted by the reference voltage Vref as described above. The output ROUT of the receiver circuit is outputted through AND logic of the RIN and the ACT signals. By reading the level of ROUT when the ACT signal is at a High level, the signal of the input DIN is transferred. Also, ROUT is outputted at the level of the CMOS logic (power supply voltage Vdd: about 2.5 V).

The use of the driver and receiver circuits of this embodiment can save power consumption while maintaining sufficient signal sensitivity and circuit stability as described above. FIG. 7 shows the results of the simulation of average current consumption waveforms for the circuit of this embodiment and for a conventional circuit (FIG. 14). Line N shows the result for the circuit of this embodiment. As a comparative example, Line P shows the result of the conventional circuit. As FIG. 7 shows, although a current of about 1 mA is consumed in the conventional circuit, the current consumed by the circuit of this embodiment is reduced to about 0.57 mA because the amplitude voltage is limited to about 0.9 V. That is, an average current consumption is reduced by about 40% per signal line. If there are 20 signal lines, the current consumed by a conventional circuit is about 20 mA, while the current consumed by this embodiment is reduced to about 11.4 mA.

Also, since a help circuit consisting of an NFET 24, plural stages of NOT gates 25, and a NOR gate 26 is provided, DOUT can be allowed to rise quickly when DIN (inverted signal of DIN-bar) is inputted. Since the amplitude of the signal line 30 is reduced, the slewing rate can be lowered. The slewing rate of a conventional circuit of about 3.76 V/ns can be reduced to about 1.41 V/ns (about a 62% reduction). The reduction of the slewing rate has the effect to decrease the transient current (current noise) of the power source, and to lower the peak current value as described below.

Since the amplitude of signals is decreased, and the above-described slewing rate is lowered compared with conventional circuits, the peak current value is reduced by about 45% from about 15.5 mA (conventional) to about 8.5 mA (this embodiment). Therefore, the current noise is reduced, and the reliability of the operation of semiconductor integrated circuit devices is improved.

Also, since the circuit of this embodiment is operated in low signal amplitude, the ACT signal of the receiver can be forwarded by a maximum of about 0.25 ns. This forwarded period is equivalent to about 6% of the operational period at 250 MHz, and contributes to the improvement of margin for the operation of semiconductor integrated circuits.

Further, the circuit of this embodiment has a low sensitivity to responding to noise accumulated in the input once the receiver of the dynamic logic structure senses the High level of the input signal RIN.

Embodiment 2

Since the semiconductor integrated circuit of this embodiment (e.g. DRAM) is the same as Embodiment 1, the detailed description of the DRAM will be omitted.

FIG. 8 is a circuit diagram showing a driver circuit 50, a signal line 30, and a receiver circuit 60 of this embodiment. The driver circuit 50 has basically the same structure as the driver circuit 20 of Embodiment 1 (shown in FIG. 2). It has an inverter structure consisting of FETs similar to FETs 21 to 23 of Embodiment 1, and outputs DOUT at a voltage limited by Vref similarly to Embodiment 1. Input signals DIN are inputted to the input of the driver circuit 50.

The operation of the driver circuit 50 will be described below. When DIN is in a Low level, the PFET 21 is in the ON state, and the NFET 23 is in the OFF state. As described for Embodiment 1, in this state, a voltage limited by Vref is outputted to DOUT, and the output voltage of DOUT drives the voltage of the signal line 30. When DIN is in a High level, the PFET 21 is in the OFF state, and the NFET 23 is in the ON state. Therefore, DOUT is disconnected from the power supply voltage Vdd, and driven by the ground voltage. Thus, the signal line 30 is always driven by any voltage, and is not in the Hi-Z state. Therefore, the signal line 30 resists voltage variations caused by, for example, the variation in voltage of adjacent signal lines, allowing a circuit with excellent insensitivity to noise to be configured. Since the driver circuit 50 is placed in the indirect peripheral circuit area, there is some available space so that the driver circuit can be composed of MISFETs (PFET 21, NFET 22) of the size to secure ON current large enough for quickly charging the signal line 30. Therefore, the charging time of the signal line 30 can be shortened to contribute to improving the operational speed or securing the operational margin of the semiconductor integrated circuit.

Next, the receiver circuit 60 will be described. The receiver circuit 60 has a latch circuit 64 comprising an NFET 61 of a low threshold voltage, an NFET 62, a PFET 63, and a plurality of logic gates. The presence of the latch circuit 64 facilitates timing design of the next stage.

The source of the NFET 61 is connected to the input RIN of the receiver circuit 60 that is connected to the signal line 30, and the drain of the NFET 61 is connected to the source of the NFET 62. The drain of the NFET 62 is inputted to the latch circuit 64, and connected to the drain of the PFET 63. The source of the PFET 63 is connected to the power supply voltage Vdd. An ACT signal is inputted to the gate of the NFET 61, and the gate of the NFET 62 is connected to Vref. The gate of the PFET 63 is grounded.

The operation of the receiver circuit 60 is basically the same as the operation of the charge-transfer system described in the background art (see FIG. 16). However, the receiver circuit 60 of this embodiment differs in that an NFET 61 that has the function as a selector is provided between the signal line 30 and the NFET 62 that performs charge sharing. Since an ACT signal is inputted to the gate of the NFET 61, the NFET 62 that performs charge sharing is connected to the signal line 30 during the operating state (ACT=High level), and the signal line 30 is disconnected from the NFET 62 when the ACT signal is in a Low level. Thus, since the signal line 30 is disconnected from the receiver circuit 60 when the receiver is not in the operating state (ACT=Low level), the signal line 30 can be charged from the driver circuit 50 side. On the other hand, the signal line 30 is either in a charged state or in a discharged state depending on the input signal DIN from the driver circuit 50, and the input of the driver does not need to be reset. Therefore, power consumption required for resetting the input in every cycle can be saved, and a pulse-generating circuit is not required. Further, since a control circuit for input pulses is not required, electric power to drive these circuits can be saved.

The sense line 65 of the receiver circuit 60 is pre-charged by the PFET 63. In this embodiment, however, since the signal line 30 is disconnected from the NFET 62, and the signal line 30 is not pre-charged as in conventional systems, the load capacitance of the sense line 65 becomes very small. Therefore, an FET having a small area with a small ON current can be used as the PFET 63. Also, the FET placed for pre-charging (PFET 126 in FIG. 16) can be eliminated resulting in a reduction of occupied device area. For example, in the case of a DRAM, since margin is produced in the vicinity of the memory array (direct peripheral circuit area) where the amount of available space is small, eliminating the FET placed for pre-charging has a large impact on circuit integration. Pre-charging is realized by operating the PFET 63 always in the ON state to pull up the sense line 65 to Vdd, instead of providing wiring to supply pre-charging signals (ACT) to the PFET 63. However, since the PFET 63 is very small, the through current is small even if the sense line 65 is pulled up always in the ON state, and the charge-sharing operation is not affected.

FIG. 9 is a graph showing simulated operational waveforms of the circuit of FIG. 8. FIG. 9(a) shows the signal waveform of an input (DIN), FIG. 9(b) shows the waveform of an ACT signal, FIG. 9(c) shows the signal waveform of an output ROUT, line (d) shows the change in the voltage of the sense line 65, and line (e) shows the change in the voltage of the wiring 66 between the NFET 61 and the NFET 62. The case where a High level is always supplied as the input signal to DIN is shown as an example. Since DIN is in a High level, the NFET 23 is in the ON state, and the signal line 30 is driven to a Low level.

Since the NFET 61 is in the OFF state when ACT is in a Low level, the voltage of the sense line 65 is driven to a High level by Vdd supplied through the PFET 63. In order to put the receiver in the read-enable state, ACT is changed to a High level to turn the NFET 61 ON. Since the signal line 30 is in a Low level, the NFET 62 is turned ON when the source voltage of the NFET 62 (voltage of the wiring 66) becomes the potential determined by Vref and the threshold voltage or below, and the charge of the sense line 65 is rapidly transferred to the source side. Then, the sense line 65 becomes a Low level, and a High level is outputted to the output ROUT connected through the latch circuit 64. Although the ON current of the PFET 63 flows even when the sense line 65 becomes a Low level, because the PFET 63 is always in the ON state, this current is extremely small, and does not affect sensing.

FIGS. 10 to 12 illustrate the effect of the transfer circuit of this embodiment. In each of FIGS. 10 to 12, (a) is a timing chart showing the driver input DIN, the ACT signal, and the receiver output ROUT in a conventional circuit; (b) is a timing chart showing the driver input DIN, the ACT signal, and the receiver output ROUT in the circuit according to this embodiment 2; and (c) is a graph of the simulated average current consumption in (a) and (b), in which the broken line shows that of the conventional circuit, and the solid line shows that of the circuit of this embodiment.

Figure 10C:
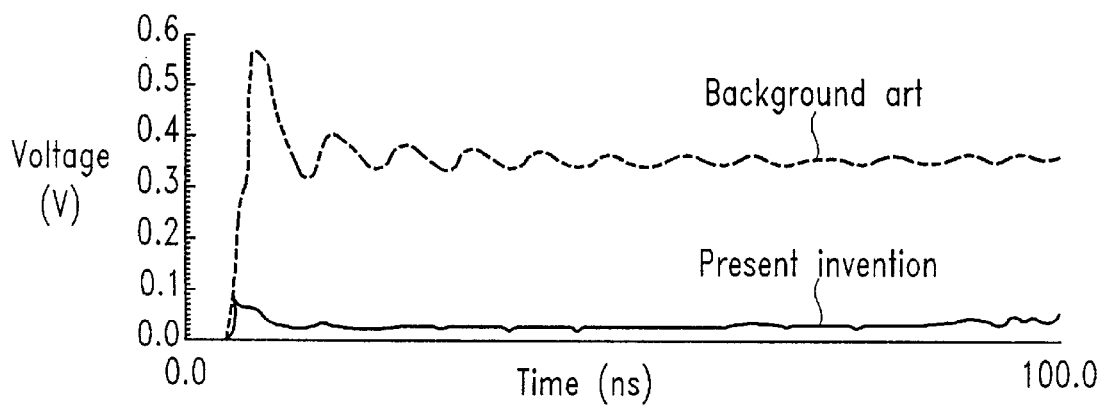
Figure 11C:
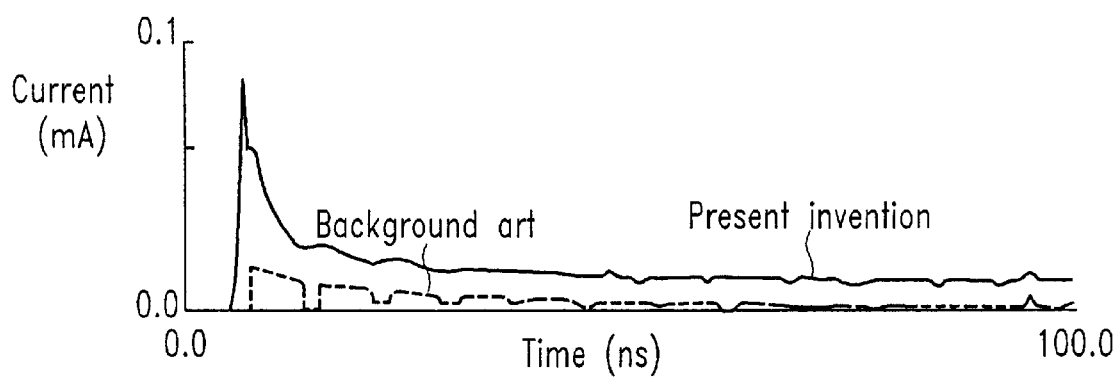

FIG. 10 shows the case where a High level is always inputted in the input DIN. As FIG. 10(c) shows, the average current consumption is significantly reduced in the circuit of this embodiment compared with the conventional circuit. The operational current can be reduced by up to about 90% compared to the conventional circuit. As described above, this embodiment does not need to reset the input in every cycle, and current required for the refreshing operation, which is wasted when a High level is always inputted as in this condition, can be reduced FIG. 11 shows the case where a Low level is always inputted in the input DIN. As FIG. 11(c) shows, the average current consumption is increased in this embodiment. However, the difference is only negligible (about 0.01 mA) compared with the effect shown in FIG. 10(c) (current reducing effect of about 0.35 mA or more).

Figure 12C:
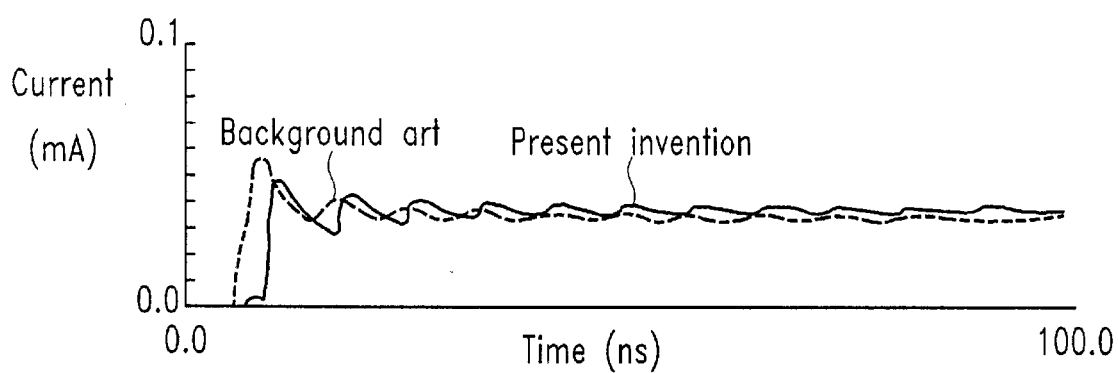

FIG. 12 shows the case where a Low level and a High level are alternately inputted in the input DIN. As FIG. 12(c) shows, little difference can be found in current consumption between this embodiment and conventional circuits.

From the results of FIGS. 10 to 12, it is found that the effect of this embodiment is significant when a High level is always inputted, and power consumption is improved in the circuit of this embodiment compared with that of conventional circuits even after the disadvantage in the case of an always Low level. In the application of this embodiment to a DRAM, the significant effect of this embodiment can be realized when the input consists mostly of signals in which a High level continues as opposed to the normal random access case.

Although the invention made by the present inventor has been described above based on the embodiments of the invention, the present invention can be embodied by adding a variety of improvements, modifications, and changes, based on the knowledge of those skilled in the art within a scope that does not deviate from the essentials of the invention.

For example, as FIG. 13 shows, the latch circuit provided in the following stage of the receiver circuit may be eliminated in Embodiment 2. In this case, the device area occupied by the latch circuit can be reduced by as much as 75%, and elimination of an FET for pre-charging is achieved compared to conventional circuits. This effect is rather significant when the circuit of the present invention is applied to a DRAM having a receiver circuit placed in the vicinity of the memory array (direct peripheral circuit area) where the available space for devices is small.

Advantages of the Invention

Among the embodiments disclosed in the present application, the advantages obtained over conventional digital signal transfer circuits include: the power consumption of the digital signal transfer circuit can be reduced; the operational speed of the digital signal transfer circuit can be improved; the noise immunity of the digital signal transfer circuit can be improved; the performance of the digital signal transfer circuit can be improved; and, the reliability and performance of semiconductor integrated circuits are improved.

What is claimed is:

1. A driver circuit, comprising:

an inverter comprising a first transistor of a first type and a second transistor of a second type; and a third transistor of the second type that is provided between the first and the second transistors, the third transistor having a control input terminal that is provided with a second voltage lower than a first voltage that operates the circuit, and wherein a threshold voltage of the third transistor is lower than a threshold voltage of the first and second transistors.

2. The driver circuit according to claim 1, wherein adjusting the second voltage controls an output voltage of the inverter at a connection of the second transistor and the third transistor to be lower than the first voltage.

3. The driver circuit according to claim 1, further comprising a fourth transistor that is connected in parallel to the third transistor, wherein a signal that is turned ON for a period of the input signal, or a period shorter than a period of the driver circuit, is supplied to a control input terminal of the fourth transistor when a signal to turn the first transistor ON is supplied to an input of the inverter.

4. The driver circuit according to claim 1, wherein the first type of transistor is a PFET and the second type of transistor is an NFET.

* * * * *